(12) United States Patent
Yasini et al.

(10) Patent No.: US 12,216,224 B2
(45) Date of Patent: Feb. 4, 2025

(54) METHOD AND APPARATUS FOR KINEMATIC STATE ESTIMATION OF A USER EQUIPMENT

(71) Applicant: Telefonaktiebolaget LM Ericsson (publ), Stockholm (SE)

(72) Inventors: Sholeh Yasini, Sundbyberg (SE); Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 343 days.

(21) Appl. No.: 17/775,982

(22) PCT Filed: Nov. 12, 2019

(86) PCT No.: PCT/SE2019/051137
§ 371 (c)(1),
(2) Date: May 11, 2022

(87) PCT Pub. No.: WO2021/096397
PCT Pub. Date: May 20, 2021

(65) Prior Publication Data
US 2022/0390545 A1    Dec. 8, 2022

(51) Int. Cl.
*G01S 5/02* (2010.01)
(52) U.S. Cl.
CPC .................. *G01S 5/0294* (2013.01)
(58) Field of Classification Search
CPC .................................................. G01S 5/0294
(Continued)

(56) References Cited

U.S. PATENT DOCUMENTS

| | | | |
|---|---|---|---|
| 8,019,352 B2 * | 9/2011 | Rappaport | H04W 64/00 342/450 |
| 2002/0122003 A1 * | 9/2002 | Patwari | G01S 11/02 342/450 |

(Continued)

FOREIGN PATENT DOCUMENTS

| | | | | |
|---|---|---|---|---|
| CN | 104813185 B | * | 2/2018 | G01S 5/0252 |
| EP | 2 972 475 A1 | | 1/2016 | |

(Continued)

OTHER PUBLICATIONS

International Search Report and Written Opinion issued in International Application No. PCT/SE2019/051137, dated Jul. 24, 2020 (16 pages).

(Continued)

*Primary Examiner* — Harry K Liu
(74) *Attorney, Agent, or Firm* — Rothwell, Figg, Ernst & Manbeck, P.C.

(57) ABSTRACT

A method for kinematic state estimation of a UE connected to a wireless communication network. The method comprises obtaining (S10) of measurement information related to a kinematic measurement concerning the UE. The kinematic measurement is achieved at a measuring time. The kinematic measurement belongs to a set of kinematic measurements. It is further determined (S20) whether the measurement information is consistent with a measurement prediction for the UE valid for the measuring time based on a kinematic state estimation of the UE. The kinematic state estimation is created using kinematic measurements of the set of kinematic measurements. If the measurement information is determined not to be consistent, the measurement information is discarded (S30). If the measurement information is determined to be consistent, the kinematic state (Continued)

estimation of the UE is updated (S31) with the measurement information.

17 Claims, 12 Drawing Sheets

(58) Field of Classification Search
USPC .......................................................... 342/450
See application file for complete search history.

(56) References Cited

U.S. PATENT DOCUMENTS

2017/0060810 A1    3/2017  Preston et al.
2017/0140141 A1*   5/2017  Yan ......................... G06F 21/32

FOREIGN PATENT DOCUMENTS

JP          2019128944 A  *  8/2019  ........... B64C 39/024
WO    WO-2021096397 A1 *  5/2021  ........... G01S 5/0244

OTHER PUBLICATIONS

Hammes, Ulrich et al., "Robust MT Tracking Based on M-Estimation and Interacting Multiple Model Algorithm", IEEE Transactions on Signal Processing, vol. 59, No. 7, Jul. 1, 2011 (pp. 3398-3409).
Wigren, Torbjörn, "Wireless Hybrid Positioning Based on Surface Modeling with Polygon Support", IEEE, 2018 (7 pages).

* cited by examiner

Fig. 12
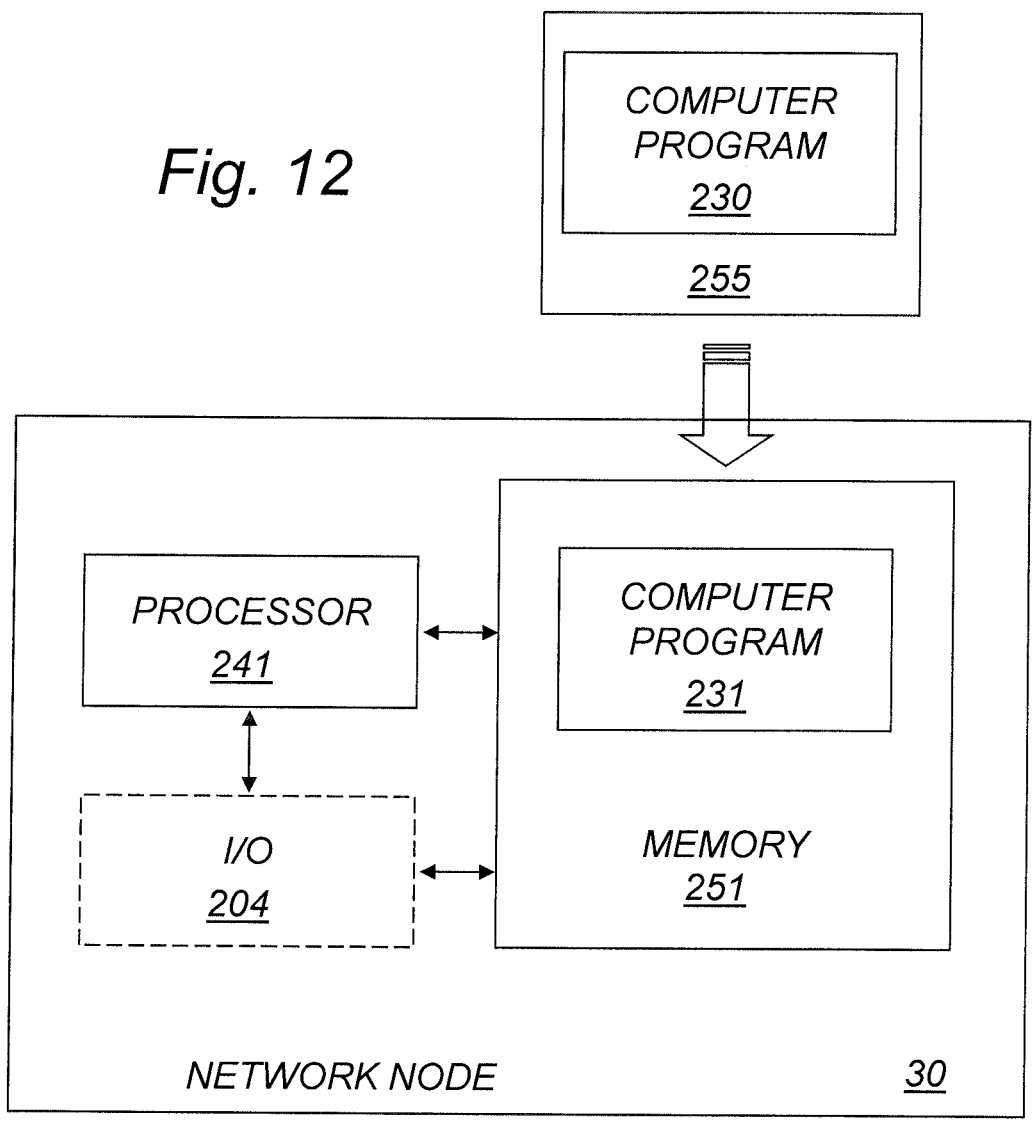
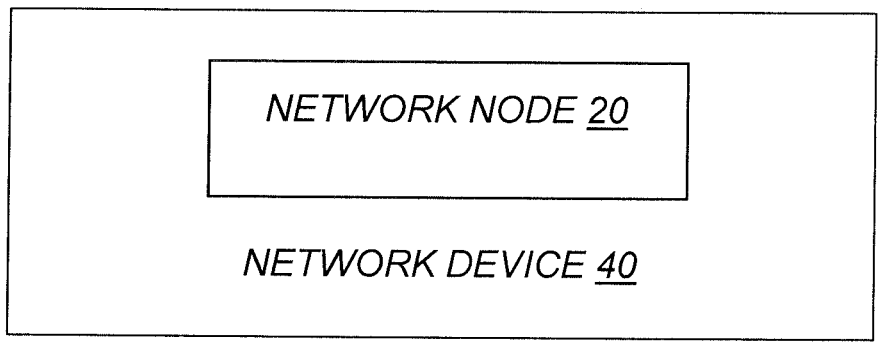
Fig. 13

METHOD AND APPARATUS FOR KINEMATIC STATE ESTIMATION OF A USER EQUIPMENT

CROSS REFERENCE TO RELATED APPLICATION(S)

This application is a 35 U.S.C. § 371 National Stage of International Patent Application No. PCT/SE2019/051137, filed Nov. 12, 2019.

TECHNICAL FIELD

The proposed technology generally relates to state estimations of user equipment and in particular to methods and devices for kinematic state estimation of a user equipment connected to a wireless communication network.

BACKGROUND

Today, airborne radio-controlled drones are becoming more and more common. These drones have in the past been limited to stay within range of the radio control equipment dedicated to control the drone.

However, recently functionality allowing drones to be remotely controlled over the cellular network has increased their range considerable. This can e.g., be achieved by attaching a Long-Term Evolution (LTE) User Equipment (UE) to the drone and by coupling the UE to the navigation system of the drone. This way, the drone is enabled to travel over multiple cells resulting in ranges that are limited only by the battery of the drone. In some markets, this is already being regulated, and UEs attached to drones are registered as such. However, a large number of users fail to register, such users being denoted as "rogue drones".

The LTE capable drones, or in the future New Radio (NR) capable drones need to be restricted in terms of their flight. This is particularly the case for rogue drones.

A first reason for this is that rogue drones that transmit and receive cellular radio messages at significant altitudes, tend to create more interference than ground based UEs. This is simply because there are less obstacles when the altitude of the drone is significant, and propagation can then be close to free-space propagation. The interference therefore reaches further and creates interference problems also in adjacent cells. At higher altitudes drones may also be served by the sidelobes of radio base station antennas that are down tilted. This may increase the risk of sudden signal changes.

A second reason is that rogue drones create hazardous situations when flying illegally in certain parts of the airspace. Examples include airports, where commercial air traffic may be at danger, military restricted areas, and the airspace over densely populated areas where a crash would be likely to cause human injuries. Note that this is likely to be a major concern for aviation authorities and thereby for cellular operators. Recently, Gatwick International Airport, London UK, had to close down for many hours due to rogue drones. Recently, also Heathrow International Airport, London, UK and Newark International Airport, NJ, USA was closed down due to unlawful flight of drones.

One approach for enabling control and/or countermeasures against rogue drones is to pinpoint the location and motion pattern of UEs. Such kinematic state information may enable identification of rogue drones, and preferably the location and motion pattern can be followed with an accuracy that allows countermeasures to be exercised effectively. Many techniques are available today that may provide tracking of moving objects. Since the UEs are present in a wireless communication system, tracking by use of radio signaling within the communication system is a feasible approach.

A prerequisite for UE kinematic state estimation is the need to measure quantities related to the drone position and its movement. This can be done in several different nodes and by using several different measurement combinations. However, a common problem in wireless communication systems is then that the measurements may be subject to interfering objects. This may result in non-line-of-sight (non-LOS) radio propagation, sometimes also manifested as shadow fading. When this occurs, the use of the measurement could introduce significant error in the estimated kinematic state of the targeted UE.

Many wireless communication systems utilize antennas distributed over an area. In many cases, these antennas are provided at approximately a same height. When measuring radio signaling within such a system, some of the available measurements will have the same effect on the estimated state, irrespective if the vertical position estimate is negative or positive relative to the antennas. This may even result in that estimated kinematic states indicate moving underground, which is un-physical and not desired.

It is thus a problem that the nature of a wireless communication system may give rise to errors in estimated kinematic states of targeted UEs.

SUMMARY

It is an object to provide methods and devices for kinematic state estimation of user equipment that are robust against artefacts caused by the nature of the wireless communication system and its environment.

This and other objects are met by embodiments of the proposed technology.

According to a first aspect, there is provided a method for kinematic state estimation of a UE connected to a wireless communication network. The method comprises obtaining of measurement information related to a kinematic measurement concerning the UE. The kinematic measurement is achieved at a measuring time. The kinematic measurement belongs to a set of kinematic measurements. It is further determined whether the measurement information is consistent with a measurement prediction for the UE valid for the measuring time based on a kinematic state estimation of the UE. The kinematic state estimation is created using kinematic measurements of the set of kinematic measurements. If the measurement information is determined not to be consistent with the measurement prediction for the UE valid for the measuring time in the determining, the measurement information is discarded. If the measurement information is determined to be consistent with the measurement prediction for the UE valid for the measuring time in the determining, the kinematic state estimation of the UE is updated with the measurement information.

According to a second aspect, there is provided a network node for kinematic state estimation of a UE connected to the wireless communication network of the network node. The network node is configured to obtain measurement information related to a kinematic measurement concerning the UE. The kinematic measurement is achieved at a measuring time. The kinematic measurement belongs to a set of kinematic measurements. The network node is further configured to determine whether the measurement information is consistent with a measurement prediction for the UE valid for the measuring time based on a kinematic state estimation of the UE. The kinematic state estimation is created using kinematic measurements of the set of kinematic measurements. The network node is further configured to discard the measurement information if the measurement information is determined not to be consistent with the measurement prediction for the UE valid for the measuring time in the determining. The network node is further configured to update the kinematic state estimation of the UE with the measurement information if the measurement information is determined to be consistent with the measurement prediction for the UE valid for the measuring time in the determining.

According to a third aspect, there is provided a computer program comprising instructions, which when executed by at least one processor, cause the processor(s) to obtain measurement information related to a kinematic measurement concerning a UE. The kinematic measurement is achieved at a measuring time. The kinematic measurement belongs to a set of kinematic measurements. The instructions, when executed by the processor(s), further cause the processor(s) to determine whether the measurement information is consistent with a measurement prediction for the UE valid for the measuring time based on a kinematic state estimation of the UE. The kinematic state estimation is created using kinematic measurements of the set of kinematic measurements. The instructions, when executed by the processor(s), further cause the processor(s) to discard the measurement information if the measurement information is determined not to be consistent with the measurement prediction for the UE valid for the measuring time in the determining step. The instructions, when executed by the processor(s), further cause the processor(s) to update the kinematic state estimation of the UE with the measurement information if the measurement information is determined to be consistent with the measurement prediction for the UE valid for the measuring time in the determining step.

According to a fourth aspect, there is provided a computer-program product comprising a computer-readable medium having stored thereon a computer program according to the third aspect.

An advantage of the proposed technology is to avoid reduction of the accuracy of the state estimate by use of non-LOS and/or shadowed measurements. Preferably, also detection mechanisms for detection of symmetric tracks below ground level and correction mechanisms therefore are provided.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 12 is a schematic diagram illustrating an embodiment of a computer-implementation of a network node;

FIG. 13 is a schematic block diagram illustrating an embodiment of a network device;

DETAILED DESCRIPTION

Throughout the drawings, the same reference designations are used for similar or corresponding elements.

By kinematic state estimation is understood an estimation of a state being motion and/or position related. A typical example is a state representing a position in three coordinates, a velocity in three coordinates and preferably also an acceleration in three coordinates.

For a better understanding of the proposed technology, it may be useful to begin with a brief overview of kinematic state estimation of objects.

The technical field of kinematic state estimation of objects is mature today, with many operational civil and military systems being operational worldwide. See for example any of the many available textbooks on the subject.

One example of a so-called multi-sensor kinematic state estimation system is described in Appendix A.

To be able to accurately estimate the movement state of a UE, it is first realized that UEs may move in very specific ways. These modes of movement preferably need to be reflected by an optimal estimator applied for measurement processing.

There are many known methods for estimation when multiple dynamic modes describe the behavior of an object, whose state is estimated. Some aspects are presented in Appendices B-D.

A note on discretization is given in Appendix E.

Figure 4:
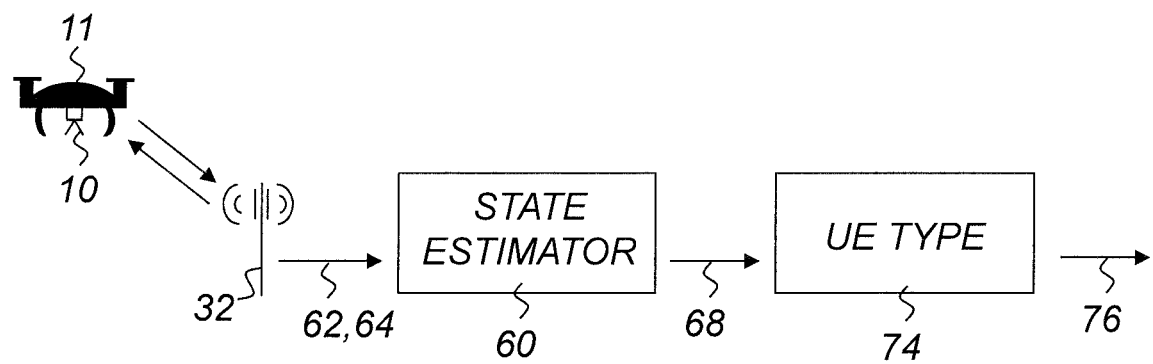
FIG. 4 illustrates a UE kinematic state estimation setup.

The drone state estimation problem treated by this is schematically illustrated in FIG. 4. A drone 11, comprising a UE 10 moves e.g. in a restricted area. The drone 11 communicates via base stations, e.g. eNBs/gNBs 32, which provides noisy kinematic measurements 62. These kinematic measurements 62 can e.g. be the range between respective eNB/gNB 32 and the drone, or Doppler shift measurements. A UE kinematic state estimator 60 uses these, typically noisy, kinematic measurements 62 to provide kinematic state estimations 61. A UE type state estimator 74 can analyze the state estimations 61 and, by using knowledge of the characteristic mode of movements of a drone 11, determine that the UE 10 has to be attached to a drone 11. Different kinds of measures can thus be performed based on drone type information 68.

Some particular measures may be taken to adapt the tracking system to solve the drone problem. A new 3-mode drone movement model can be adopted. This is described more in detail in Appendix F.

Inclusion of ground altitude information is discussed in Appendix G.

Since UEs are connected to a wireless communication system and communicate with base stations utilizing radio signals, it is rather straight-forward to use properties of the radio signals to achieve information about kinematic properties of the UE. There are a number of possibilities, depending on the design of the wireless communication system. Ranges between a network antenna and a UE can be associated with e.g. propagation times of the radio signals. Ranges can also be associated with pathloss of a radio signal. Furthermore, relative velocities can be associated with Doppler shifts in the radio signals. Direction information of radio signals may also be of use. If such information is available, preferably from a multiple of antenna sites, triangulation approaches can typically deduce kinematic state estimations of the UE. Common for all these approaches is that they are based on radio signals and their propagation between a network antenna and the UE or vice versa.

In an ideal radio world, where there are no obstacles for the radio signal propagation, the measured signal properties can safely be relied on. However, in the real world, there are disturbing influences from different physical items. Moreover, the relative positioning of the antenna sites is sometimes unfavorable for certain estimation approaches.

Figure 5A:
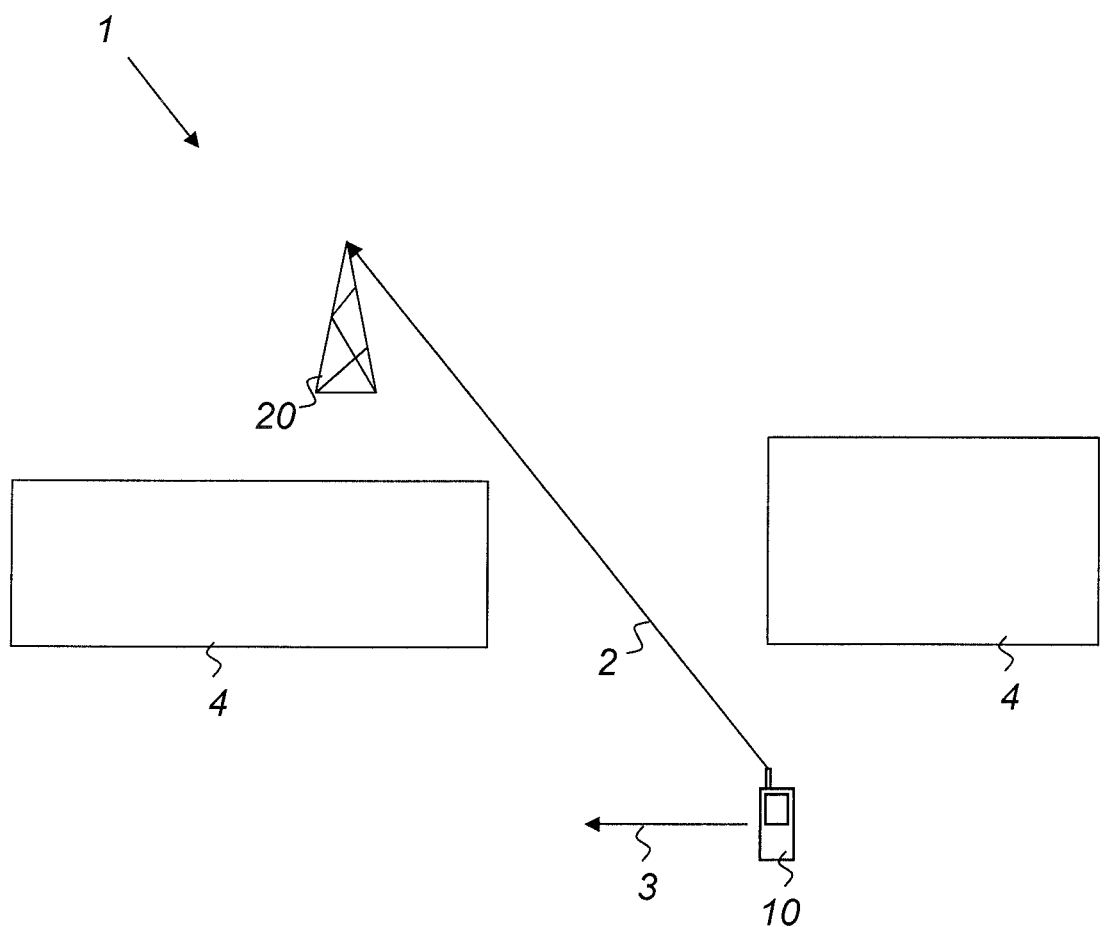
FIG. 5A is a schematic illustration of a base station and UE with LOS signaling conditions.

FIG. 5A illustrates schematically a UE 10 and a base station 20 of a wireless communication system 1. Uplink signals 2 from the UE 10 are detected at the base station 20. This uplink signal is a line-of-sight (LOS) signal propagating in a single direction all the way between the transmitter and receiver. The UE 10 in the direction indicated by the arrow 3. Blocking items 4, e.g. buildings or natural obstacles for radio signals are present in the area.

Figure 5B:
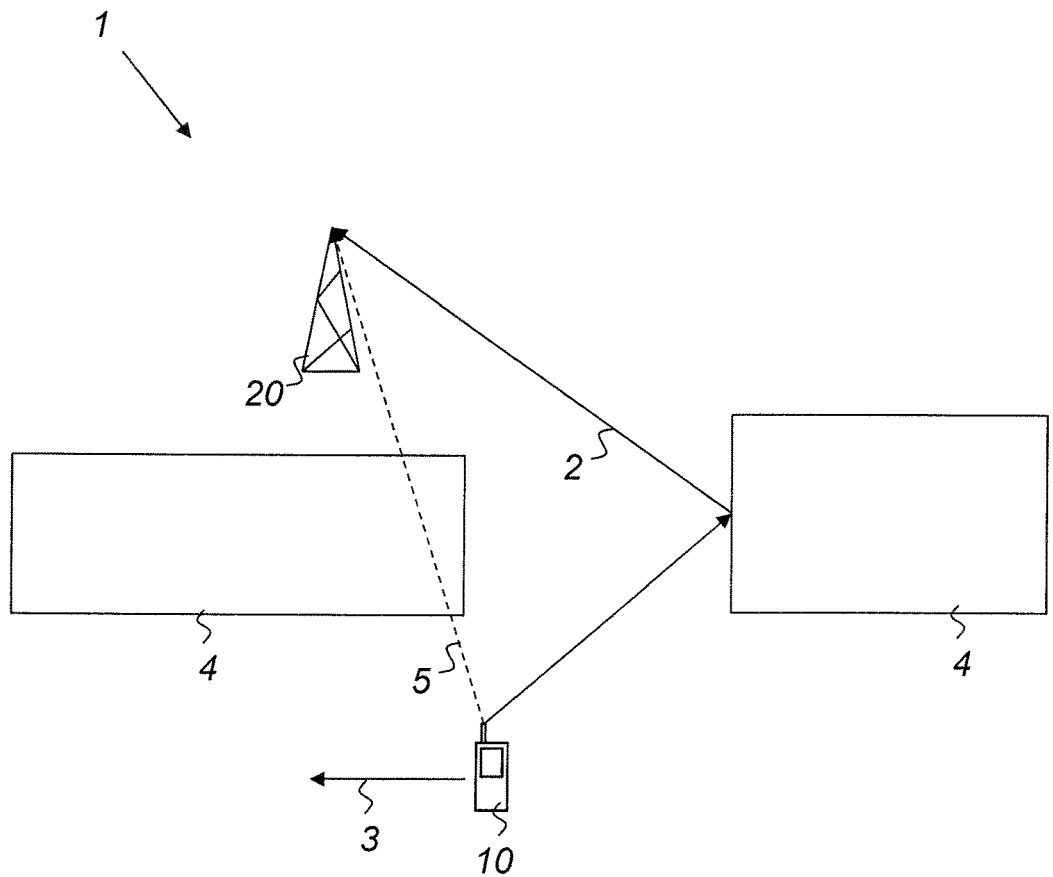
FIG. 5B is a schematic illustration of a base station and UE with non-LOS signaling conditions.

In FIG. 5B, the UE 10 has travelled a distance and there is no longer any LOS path between the UE 10 and the base station 20, as indicated by the dotted arrow 5. Instead, the uplink signal 2 reaching the base station 20 is a reflected signal, reflected in one of the blocking items 4. It is possible that the uplink signal 2 still is useful for communication between the UE 10 and the base station 20, however, the use of the uplink signal 2 to be used for kinematic state estimations is highly questionable.

Figure 5C:
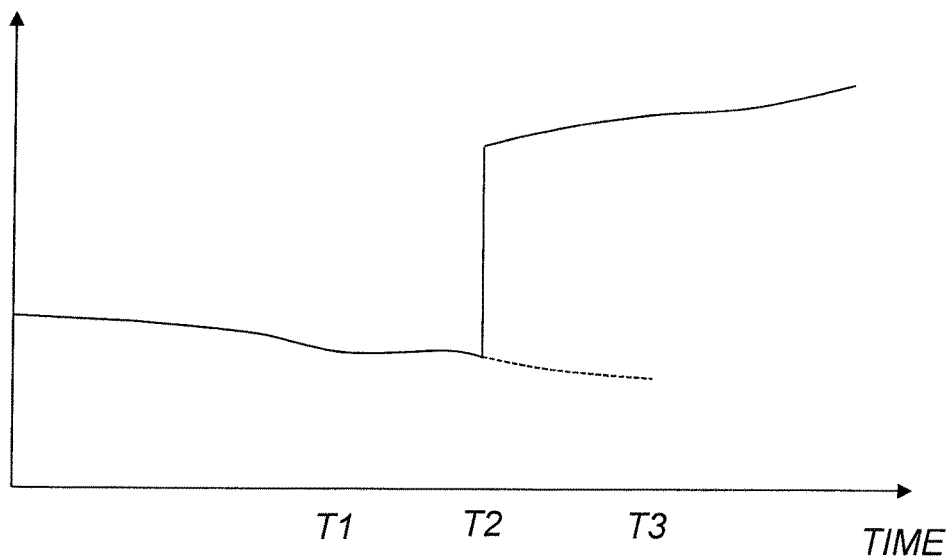
FIG. 5C is a diagram illustrating a schematic time evolution of a kinematic parameter when LOS is lost.

In FIG. 5C, a time diagram is shown, illustrating a property of an uplink signal as a function of time in a situation similar to the FIGS. 5A and 5B. The signal property could e.g. by a propagation time, an angle of arrival, a Doppler shift or a path loss. The property varies with relatively small amounts and with a moderate derivative in the first part of the diagram. The time T1 could e.g. correspond to the situation in FIG. 5A. At time T2, one of the blocking items 4 comes into the path of the LOS signal and a sudden change of the signal property occurs due to the fact that it now is the reflected signal that reaches the base station 20 instead of the LOS signal. Time T3 could then correspond to the situation in FIG. 5B. A tracking procedure applied on the UE would predict a behavior of the signal property between times T2 and T3 according to the dotted curve.

In most tracking systems, input data showing such abrupt changes depending on e.g. system geometrics are very difficult to handle. If detailed information about the blocking items 4 and their properties are available, it would in principle be possible to include them in the estimation model. However, this requires extensive modelling being unique for each application. In less detail-modelled systems, the fast shift in the input data will just ruin the entire tracking.

It is thus important in most kinematic state estimation systems to find such anomalies and exclude this data from being used in the estimation process.

Figure 6:
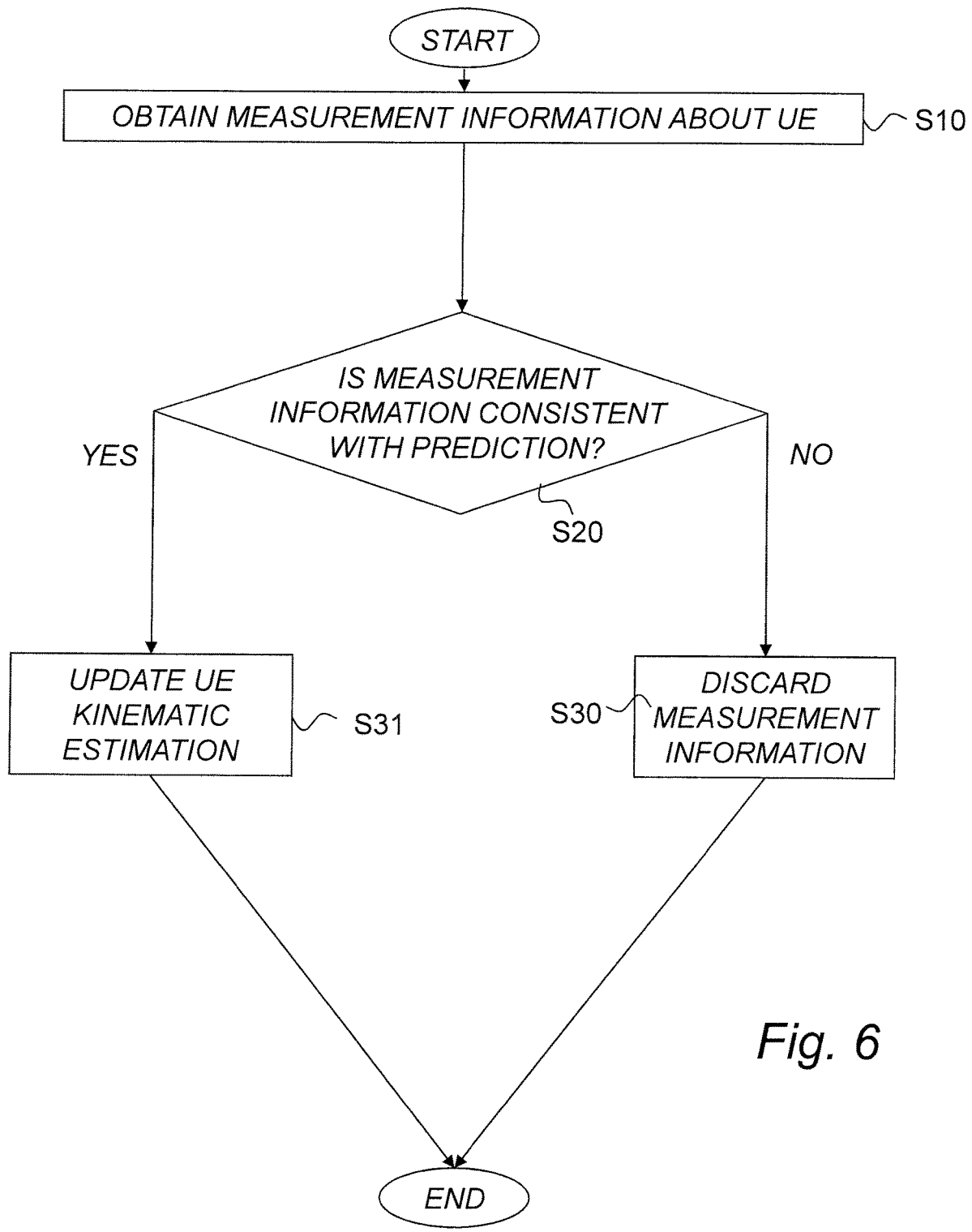
FIG. 6 is a schematic flow diagram illustrating steps of an embodiment of a method for kinematic state estimation of a UE connected to a wireless communication network.

FIG. 6 is a flow diagram illustrating steps of an embodiment of a method for kinematic state estimation of a UE connected to a wireless communication network. In step S10, measurement information is obtained that is related to a kinematic measurement concerning the UE. The kinematic measurement is achieved at a known measuring time. The kinematic measurement belongs to a set of kinematic measurements.

In step S20, it is determined whether the measurement information is consistent with a measurement prediction for the UE valid for the measuring time based on a kinematic state estimation of the UE. The kinematic state estimation is created using kinematic measurements of the above-mentioned set of kinematic measurements.

Figure 7:
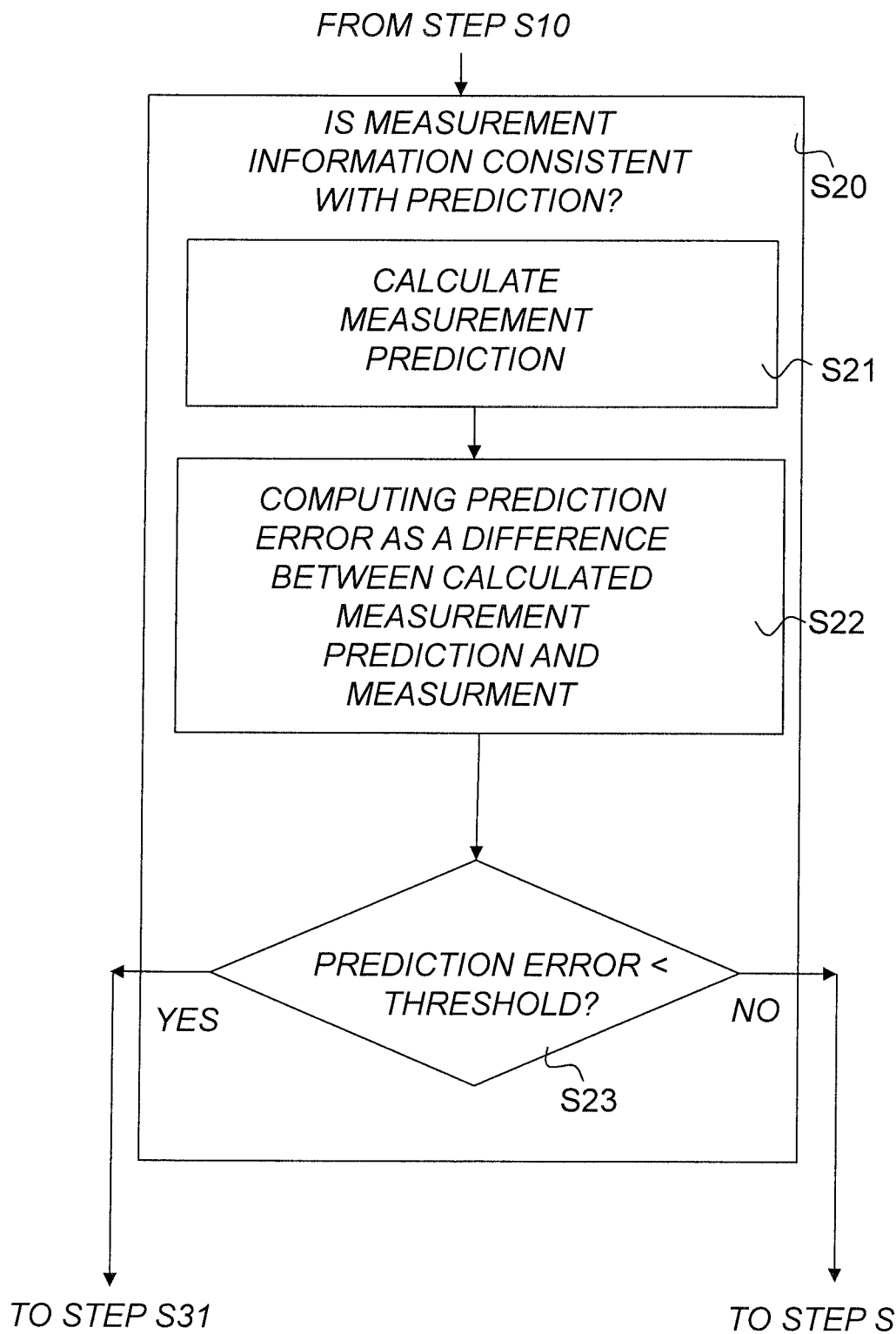
FIG. 7 is a schematic flow diagram of one embodiment of part steps of step S20 of FIG. 6.

In a preferred embodiment, step S20 comprises part steps as illustrated in FIG. 7. The step S20 there comprises step S21, where a measurement prediction for the UE is calculated. The measurement prediction is valid for the measuring time and is based on the kinematic state estimation of the UE. In step S22, a prediction error is computed. The prediction error represents a difference between the calculated measurement prediction and the kinematic measurement. In step S23 it is concluded if the prediction error is less than a prediction error discrimination threshold. If this is the case, the measurement information is determined to be consistent with the measurement prediction.

The threshold can be obtained according to different approaches. In one particular embodiment, the prediction error threshold is a predetermined prediction error discrimination threshold. Such a predetermined prediction error could be based on general considerations about the mobility of a UE in terms of e.g. acceleration.

In some applications, the accuracy of the actual kinematic state estimation may vary with time and position. In such cases, it might be advantageous with a threshold that adapts to the current estimation conditions. Therefore, in another particular embodiment, the step of determining if the measurement information is consistent with the prediction further comprises the step of establishing the prediction error discrimination threshold in dependence of an uncertainty of the measurement prediction for the UE.

In a further embodiment, the prediction error discrimination threshold is established to be equal to a predetermined significance level of a $\chi^2$ distribution of the measurement prediction for the UE.

In yet a further embodiment, the predetermined significance level is 95%.

Returning to FIG. 6, if the measurement information is determined not to be consistent with the measurement prediction for the UE valid for the measuring time, the process continues to step S30, in which the measurement information is discarded. If the measurement information is determined to be consistent with the measurement prediction for the UE valid for the measuring time, the process instead continues to step S31, in which the kinematic state estimation of the UE is updated with the measurement information.

One aspect of the above presented technology is thus to evaluate the measurements before using them in the kinematic state estimation. Assuming that the kinematic state estimation of the UE is working properly, the accuracy of the state estimate is then quantified by the state covariance matrix. In addition, the measurement accuracy of each measurement may also be available, e.g. from laboratory measurements or from field trials. This information can then be used to derive the probability that a new measurement is subject to e.g. non-LOS or shadow fading.

Now noting that the prediction error of any movement mode and measurement combinations is in one embodiment given by the quantity:

$$V(k+1|k)=z(k+1)-\hat{z}(k+1|k), \quad (1)$$

where $z(k+1)$ denotes the measurement and $\hat{z}(k+1)$ is the measurement prediction, conditioned on the state and state covariance matrix. It is assumed that the measurement dimension here is M. Then, it follows that the innovation covariance is:

$$S(k+1)=E[V(k+1|k)V(k+1|k)^T]=C(k+1)P(k|k)C^T(k+1)+R_2, \quad (2)$$

where:

$$C(k+1) = \frac{\partial h(\hat{x}(k+1))}{\partial \hat{x}}, \quad (3)$$

where h is the measurement vector or measurement equation.

Thus, the prediction error is Gaussian distributed with the following probability density function:

$$p(V(k+1|k)) = \frac{1}{(2\pi)^{M/2}\sqrt{|S(k+1)|}} e^{-\frac{v(k+1|k)^T S^{-1}(k+1) v(k+1|k)}{2}}, \quad (4)$$

where $|S(k+1)|$ is the determinant of $S(k+1)$.

Next it is straightforward to specify an ellipsoidal gate:

$$V(k+1|k)^T S^{-1}(k+1) V(k+1|k) \leq G, \quad (5)$$

within which the measurement is accepted as not considered being subject to non-LOS propagation or shadowing. Since it is trivial to see that $V(k+1|k)^T S^{-1}(k+1) V(k+1|k)$ is chi-square distributed with M degrees of freedom, the gate G can then be determined by specification of a probability that a LOS measurement is erroneously classified as a non-LOS one, by solution of:

$$\text{Probability}[X_2^M > G], \quad (6)$$

where $X_2^M$ denotes a chi-square distributed stochastic variable with M degrees of freedom. Other alternatives exist as well.

The non-LOS discrimination rule is hence:
If $V(k+1|k)^T S^{-1}(k+1) V(k+1|k) \leq G$
   Update state with measurement
Else
   Do not update state with measurement, i.e. disregard the update
End.

In one embodiment, the kinematic state estimation is performed using Kalman filtering. In a further embodiment, the kinematic state estimation is performed using extended Kalman filtering.

In one embodiment, the measurement prediction for the UE is calculated using the kinematic state estimation of the UE propagated to the measuring time, and the prediction error discrimination threshold is dependent on a state covariance matrix of the Kalman filtering of the kinematic state estimation.

The above presented approach can be utilized with a number of different measurements.

Figure 8:
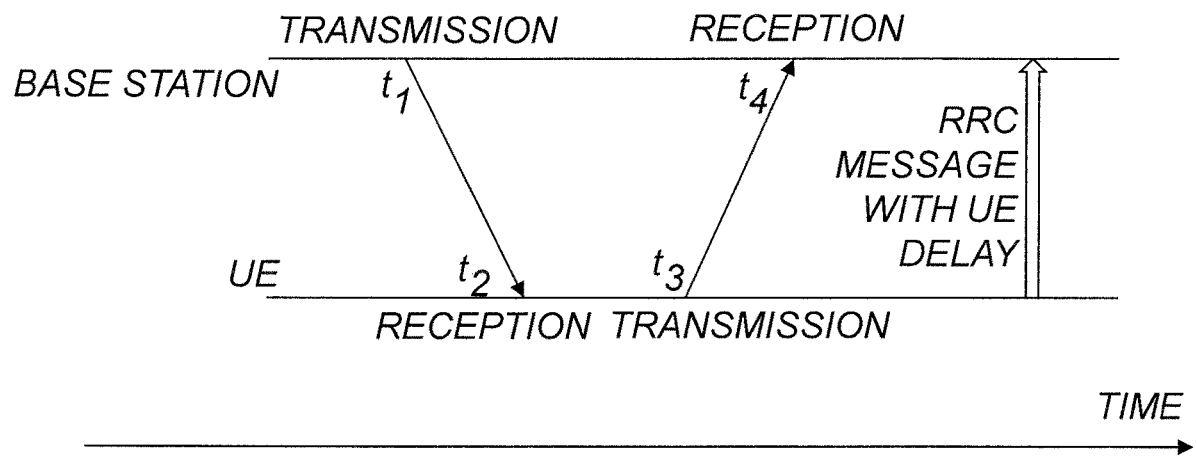
FIG. 8 illustrates the principle of round trip time measurements.

Range measurement may e.g. be a useful base. There are several possibilities for range measurement, e.g. with round trip time (RTT) or timing advance. A good basis for measurement of range is to measure the travel time of radio waves from a base station to a UE and back, i.e., a RTT measurement. Given the RTT measurement, the range follows as:

$$R = c\frac{RTT}{2}, \quad (7)$$

where c denotes the speed of light. The principle of the RTT measurement is illustrated in FIG. 8. A base station transmits a signal at a time instant $t_1$. The signal propagates to the UE, which receives the signal at a time instant $t_2$. The UE replies with a reply signal, which is transmitted at a time instant $t_3$. The reply signal is received in the base station at a time instant $t_4$. The UE keeps track on the delay, UE RxTx, between the reception of the first signal and the transmission of the reply signal and signals this delay time to the base station, typically in a radio resource protocol (RRC) message. The UE RxTx is measured in the UE as:

$$\text{UE } RxTx = t_3 - t_2 \quad (8)$$

At the base station side, the true RTT time can then be obtained as:

$$RTT = t_4 - t_1 - \text{UE } RxTx, \quad (9)$$

It can be noted that the main contribution of the inaccuracy of the measurement originates from the two reception processes in the UE and the base station. The theoretical inaccuracy of one such measurement is, in free space propagation, inversely proportional to the measurement bandwidth, as:

$$\Delta t \geq \frac{1}{4\pi}\frac{1}{\Delta f}. \quad (10)$$

This means that in case the measurement bandwidth is for example 30 MHz, then the best time inaccuracy that is possible is 2.65 ns which corresponds to a little less than 1 m. That's a 1 sigma value. Since two independent measurement processes are used for RTT a 40 MHz measurement bandwidth would result in a combined RTT measurement inaccuracy of about 1 m.

Another way of obtaining range measurement is to perform path-loss measurements. That is, however, typically not accurate enough to be the sole source of kinematic state information, since the pathloss is affected by radio fading and since range needs to be computed from an assumed radio propagation model. However, it can be utilized in combination with other measurements.

Radio propagation is complicated. Here, only static properties will be discussed, disregarding the fast fading. In free space, it is straightforward to use power density arguments to arrive at the formula:

$$\frac{P_{receive}}{P_{transmit}} = \left(\frac{c}{4\pi f_c r}\right)^2. \quad (11)$$

Here c is the speed of light, $f_c$ is the carrier frequency and r is the distance. Inverting this equation leads to the path loss:

$$L = \left(\frac{4\pi f_c r}{c}\right)^2. \quad (12)$$

In case the drone is near ground it is affected also by reflections and obstacles and then other more complicated propagation models like the Okumura-Hata model can be applied. This model is given by:

$$L = A + B \log(r) - \alpha(h_m) + D, \quad (13)$$

where r denotes the range, A, B, D are constants selected for the particular radio environment and where $h_m$ is the height of the tower. The function $a(h_m)$ is discussed in the radio propagation literature. Below a generally valid formula for the path loss will be used.

Range rate related measurements can also be used for kinematic state estimation. Doppler measurements are readily available in the wireless systems, at least for the serving cell. Briefly, the Doppler frequency is related to the speed by which a user departs from a radio source as:

$$f_D = \frac{v}{c} f_c, \quad (14)$$

where $f_D$ is the Doppler frequency, v is the velocity of the UE from the base station, c is the speed of light and $f_c$ is the carrier frequency.

The Doppler measurement can be obtained in several ways. The best approach is probably to use the Fourier transformations that is done when Orthogonal Frequency-Division Multiplexing (OFDM) reception is performed in 4G and 5G cellular systems. The Fourier transform pair:

$$e^{iw_0 t} f(t) \leftrightarrow F(j(w-w_0)) \quad (15)$$

can then be exploited in the uplink to compare the phase shift between pilot signals on say two OFDM symbols after each other.

In LTE the Physical Uplink Control Channel (PUCCH) needs to be used for this purpose, while in NR the Physical Uplink Channel (PUCH) and sounding reference signals (SRSs) may be used, since in NR up to 4 adjacent symbols may be scheduled as SRS.

Angle of Arrival (AoA) measurements can also be performed by antenna arrays. Using configured information about the location and orientation of the antenna array used for AoA or Angle of Transmission (AoT) measurement, it is obvious that the measured AoA or AoT can be readily transformed to the Cartesian Earth Tangential co-ordinate system where kinematic state estimation is performed. In principle, AoA information together with range information allows a single eNB or gNB to operate like a radar system.

There are a number of different combinations of measurements in LTE and NR that allows kinematic state estimation. Some of these measurements are subject to non-LOS propagation and/or shadowing. These measurement combinations are preferably at least one of the following.

Multiple RTT measurements are under standardization in NR and may be used alone for kinematic state estimation. Both the Uplink (UL) and Downlink (DL) radio signal propagation paths may be subject to non-LOS propagation, often the same non-LOS propagation. For triangulation purposes, RTT measurements from at least three sites are required. In other words, in one embodiment, the set of kinematic measurements comprises RTT measurements from at least three sites.

As an alternative in LTE or NR, timing advance (TA) measurement, with respect to the serving eNB/gNB, can be used together with path loss/received power measurements with respect to neighbor eNB/gNbs (>=2). The TA measurement is typically a RTT measurement as in the case above, while the pathloss/power measurements relate to range via a propagation model. Path loss may be based on received power measurements in the UE, or eNB/gNB, based on transmit power from the transmitting node. Both the UL and DL radio signal propagation paths may be subject to non-LOS propagation, often the same non-LOS propagation.

In both LTE and NR, path loss or received power measurements with respect to neighbor eNB/gNbs are available and may be used as a main information source. At least three sites have to be involved. The pathloss/power measurements relate to range via a propagation model, see the above discussion. Path loss may be based on received power measurements in the UE, or eNB/gNB, based on transmit power from the transmitting node. Both the UL and DL radio signal propagation paths may be subject to non-LOS propagation, often the same non-LOS propagation.

As was mentioned above, the accuracy of only pathloss/power measurements is believed to be low in LTE and probably also NR systems and preferably, the measurements are combined with e.g. range rate measurements. Path loss/received power measurements with respect to at least three neighbor eNB/gNbs, together with Doppler measurements from a number of sites, serving and neighbors, can be used. The pathloss/power measurements relate to range via a propagation model, while the Doppler measurements relate to range rate, see the above discussion. Path loss may be based on received power measurements in the UE, or eNB/gNB, based on transmit power from the transmitting node. Both the UL and DL radio signal propagation paths may be subject to non-LOS propagation, often the same non-LOS propagation. In other words, in one embodiment, the set of kinematic measurements comprises path loss or received power measurements with respect to at least three sites together with Doppler measurements.

Another alternative in LTE and NR is to use TA measurement, with respect to the serving eNB/gNB, together with path loss/received power measurements with respect to at least two neighbor eNB/gNbs, further together with Doppler measurements from a number of sites, serving and/or neighbors. The TA measurement is typically an RTT measurement. The pathloss/power measurements relate to range via a radio propagation model, while the Doppler measurements relate to range rate. Path loss may be based on received power measurements in the UE, or eNB/gNB, based on transmit power from the transmitting node. Both the UL and DL radio signal propagation paths may be subject to non-LOS propagation, often the same non-LOS propagation. In other words, in one embodiment, the set of kinematic measurements comprises timing advance measurements with respect to a serving base station, path loss/received power measurements with respect to at least two neighbor sites and Doppler measurements.

In LTE and NR a combination of range measured either by TA or by path loss, in a single eNb or gNB, with AoA information measured in the same eNB or gNB, allows the eNb or gNb to operate as a short-range radar. Here both measurements may be subject to non-LOS measurement effects. In other words, in one embodiment, the set of kinematic measurements comprises timing advance measurements or path loss measurements with respect to a serving base station and angle of arrival measurements in the serving base station.

The original problem discussed above concerns illegal flying with so called rogue drones. There are a number of lacking items in prior art that prevent robust and high performing kinematic state estimation intended for rogue drone detection.

One advantageous aspect is to provide the new 3-mode drone movement model of Appendix F.

In other words, in one embodiment, the step of updating the kinematic state estimation of the UE comprises interacting-multiple-model (IMM) filtering. Preferably, the interacting-multiple-model filtering comprises three interacting models. More preferably, the interacting-multiple-model filtering comprises a three-dimensional constant velocity movement Wiener process, a three-dimensional constant acceleration movement Wiener process, and a three-dimensional constant position Wiener process.

Another new aspect of the IMM filtering process, disclosed in Appendix F, is related to the physics of the drone movement.

In other words, in one embodiment, the interacting-multiple-model filtering comprises a reduced switching probability between the three-dimensional constant velocity movement Wiener process and the three-dimensional constant position Wiener process.

When defining the measurement equations and the corresponding Jacobians in the following sections, a single measurement is used. This is because when the measurements are uncorrelated, as can be expected with respect to different base stations, the Extended Kalman Filter (EKF) update can be performed sequentially, fusing one measurement at a time to the state. This is because one may think of the measurements as separate, arriving with a very small time between them. It is of course also possible to fuse simultaneously using matrix relations, however, that would be much harder to describe and would also be more computationally complex.

A nonlinear range measurement model may be used, based on an RTT measurement. The RTT based range measurement model is:

$$h(\hat{x}(t)) = \frac{2\sqrt{(\hat{x}_1(k) - x_{s,1}(k))^2 + (\hat{x}_2(k) - x_{s,2}(k))^2(\hat{x}_3(k) - x_{s,3}(k))^2}}{c}, \quad (16)$$

where $x_s(.)$ denotes the site position and the constant c is the speed of the light. The hat indicates a state estimate. The derivative of the measurement model is defined as:

$$\frac{\partial h(\hat{x})(k)}{\partial \hat{x}} = \quad (17)$$

-continued $$\left( \begin{array}{c} \frac{2(\hat{x}_1(k) - x_{s,1}(k))}{c\sqrt{(\hat{x}_1(k) - x_{s,1}(k))^2 + (\hat{x}_2(k) - x_{s,2}(k))^2(\hat{x}_3(k) - x_{s,3}(k))^2}} \\ \frac{2(\hat{x}_2(k) - x_{s,2}(k))}{c\sqrt{(\hat{x}_1(k) - x_{s,1}(k))^2 + (\hat{x}_2(k) - x_{s,2}(k))^2(\hat{x}_3(k) - x_{s,3}(k))^2}} \\ \frac{2(\hat{x}_3(k) - x_{s,3}(k))}{c\sqrt{(\hat{x}_1(k) - x_{s,1}(k))^2 + (\hat{x}_2(k) - x_{s,2}(k))^2(\hat{x}_3(k) - x_{s,3}(k))^2}} \end{array} \right)'.$$

In this example it is assumed that the measurement is done with respect to one site, at the time of update. In an application, multiple measurements would appear as new rows. Note also that the Jacobian as given here is for the hovering mode. Obvious modifications appear for the constant velocity and constant acceleration models Nonlinear Path Loss Range Model To get a general expression for the pathloss measurement, valid for any model, it is assumed that the pathloss is given by:

$$L(\hat{x}(k)) = g(r(\hat{x}(k))), \quad (18)$$

where $g(r)$ is a smooth function of the range that depends on the applied propagation model. The calculations parallel the ones of the previous section, hence:

$$h(\hat{x}(t)) = g\left(\sqrt{(\hat{x}_1(k) - x_{s,1}(k))^2 + (\hat{x}_2(k) - x_{s,2}(k))^2 + (\hat{x}_3(k) - x_{s,3}(k))^2}\right), \quad (19)$$

$$\quad (20)$$

$$\frac{\partial h(\hat{x})(k)}{\partial \hat{x}} =$$

$$\frac{\partial g(\hat{x}(k))}{\partial r} \left( \begin{array}{c} \frac{(\hat{x}_1(k) - x_{s,1}(k))}{\sqrt{\hat{x}_1(k) - x_{s,1}(k))^2 + (\hat{x}_2(k) - x_{s,2}(k))^2 + (\hat{x}_3(k) - x_{s,3}(k))^2}} \\ \frac{(\hat{x}_2(k) - x_{s,2}(k))}{\sqrt{\hat{x}_1(k) - x_{s,1}(k))^2 + (\hat{x}_2(k) - x_{s,2}(k))^2 + (\hat{x}_3(k) - x_{s,3}(k))^2}} \\ \frac{(\hat{x}_3(k) - x_{s,3}(k))}{\sqrt{(\hat{x}_1(k) - x_{s,1}(k))^2 + (\hat{x}_2(k) - x_{s,2}(k))^2 + (\hat{x}_3(k) - x_{s,3}(k))^2}} \end{array} \right)'.$$

As stated above, there are several methods in prior art with which Doppler information can be obtained in multiple sites. Here it is disclosed how to exploit that information for enhances rogue drone state estimation. To do so, it is necessary to relate the measured Doppler frequency, to the estimated states in a measurement equation.

Denoting the Doppler frequency measured in site s and related quantities with a subscript s as above, leads to:

$$f_{D,s} = \frac{v_s}{c} f_c, \quad (21)$$

where $v_s$ denotes the speed with which the distance between node s and the UE (rogue drone) increases. Now some vector computations lead to:

$$v_s = \frac{(\hat{r} - \hat{r}_s)}{\|\hat{r} - \hat{r}_s\|} \cdot \dot{\hat{r}} = \frac{(\hat{x}_1 - x_{s,1})\hat{x}_4 + (\hat{x}_2 - x_{s,2})\hat{x}_5 + (\hat{x}_3 - x_{s,3})\hat{x}_6}{\sqrt{(\hat{x}_1 - x_{s,1})^2 + (\hat{x}_2 - x_{s,2})^2 + (\hat{x}_3 - x_{s,3})^2}}, \quad (22)$$

where $\hat{r}$ and $\hat{r}_s$ are the estimated position vectors of the UE and node, from the origin of the coordinate system, and where $\dot{r}$ is the range rate vector of the UE. The disclosed combined measurement equation for one Doppler measurement thus becomes:

$$h(\hat{x}) = \frac{f_c}{c} \frac{((\hat{x}_1 - x_{s,1})\hat{x}_4 + (\hat{x}_2 - x_{s,2})\hat{x}_5 + (\hat{x}_3 - x_{s,3})\hat{x}_6)}{\sqrt{(\hat{x}_1 - x_{s,1})^2 + (\hat{x}_2 - x_{s,2})^2 + (\hat{x}_3 - x_{s,3})^2}}. \quad (23)$$

This measurement equation is clearly irrelevant for the hovering mode. It needs to be applied to the two other modes only, skipping the update for the hovering mode. Several measurement equations are then straightforward to combine, by adding rows to the measurement matrix $h(\hat{x})$ of the EKF. It remains to compute the derivative of the measurement matrix. Examplifying this computation for site s results in:

$$\frac{\partial h(\hat{x})}{\partial \hat{x}} = \begin{pmatrix} \frac{\partial h}{\partial \hat{x}_1} & \frac{\partial h}{\partial \hat{x}_2} & \frac{\partial h}{\partial \hat{x}_3} & \frac{\partial h}{\partial \hat{x}_4} & \frac{\partial h}{\partial \hat{x}_5} & \frac{\partial h}{\partial \hat{x}_6} & 0 & 0 & 0 \end{pmatrix}, \quad (24)$$

where $$\frac{\partial h}{\partial \hat{x}_1} = \frac{f_c}{c} \frac{\hat{x}_4}{\sqrt{(\hat{x}_1 - x_{s,1})^2 + (\hat{x}_2 - x_{s,2})^2 + (\hat{x}_3 - x_{s,3})^2}} - \quad (25)$$

$$\frac{f_c}{c} \frac{(\hat{x}_1 - x_{s,1})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - \hat{x}_{s,1})^2 + (\hat{x}_2 - \hat{x}_{s,2})^2 + (\hat{x}_3 - \hat{x}_{s,3})^2\right)^{\frac{3}{2}}},$$

$$\frac{\partial h}{\partial \hat{x}_2} = \frac{f_c}{c} \frac{\hat{x}_5}{\sqrt{(\hat{x}_1 - x_{s,1})^2 + (\hat{x}_2 - x_{s,2})^2 + (\hat{x}_3 - x_{s,3})^2}} - \quad (26)$$

$$\frac{f_c}{c} \frac{(\hat{x}_2 - x_{s,2})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{s,1})^2 + (\hat{x}_2 - x_{s,2})^2 + (\hat{x}_3 - x_{s,3})^2\right)^{\frac{3}{2}}},$$

$$\frac{\partial h}{\partial \hat{x}_3} = \frac{f_c}{c} \frac{\hat{x}_6}{\sqrt{(\hat{x}_1 - x_{s,1})^2 + (\hat{x}_2 - x_{s,2})^2 + (\hat{x}_3 - x_{s,3})^2}} - \quad (27)$$

$$\frac{f_c}{c} \frac{(\hat{x}_3 - x_{s,3})((\hat{x}_1 - x_{s,1})\hat{x}_4 + (\hat{x}_2 - x_{s,2})\hat{x}_5 + (\hat{x}_3 - x_{s,3})\hat{x}_6)}{\left((\hat{x}_1 - x_{s,1})^2 + (\hat{x}_2 - x_{s,2})^2 + (\hat{x}_3 - x_{s,3})^2\right)^{\frac{3}{2}}},$$

$$\frac{\partial h}{\partial \hat{x}_4} = \frac{f_c}{c} \frac{(\hat{x}_1 - x_{s,1})}{\sqrt{(\hat{x}_1 - x_{s,1})^2 + (\hat{x}_2 - x_{s,2})^2 + (\hat{x}_3 - x_{s,3})^2}}, \quad (28)$$

$$\frac{\partial h}{\partial \hat{x}_5} = \frac{f_c}{c} \frac{(\hat{x}_2 - x_{s,2})}{\sqrt{(\hat{x}_1 - \hat{x}_{s,1})^2 + (\hat{x}_2 - \hat{x}_{s,2})^2 + (\hat{x}_3 - \hat{x}_{s,3})^2}}, \quad (29)$$

$$\frac{\partial h}{\partial \hat{x}_6} = \frac{f_c}{c} \frac{(\hat{x}_3 - x_{s,3})}{\sqrt{(\hat{x}_1 - x_{s,1})^2 + (\hat{x}_2 - x_{s,2})^2 + (\hat{x}_3 - x_{s,3})^2}}. \quad (30)$$

In this example it is thus assumed that the measurement is done with respect to one site, at the time of update. In an application, multiple measurements would appear as new rows. Note also that the Jacobian as given is given for the constant acceleration model, as an example. Obvious modifications appear for the constant velocity model. Note in particular that the Jacobian is irrelevant for the hovering mode since the update is skipped.

In principle, AoA information together with range information allows a single eNB or gNB to operate like a radar system. It is therefore of interest to define the measurement models relevant for AoA processing. Using configured information about the location and orientation of the antenna array used for AoA or AoT measurement, it is obvious that the measured AoA or AoT can be readily transformed to the Cartesian Earth Tagential co-ordinate system where drone state estimation is performed. This is all well known from prior art. It is hence assumed that azimuth and elevation angles φ and θ are available. These relate to the estimated states via the following 2-dimensional measurement vector equation:

$$h(\hat{x}(k)) = \begin{pmatrix} \hat{\varphi}(k) \\ \hat{\theta}(k) \end{pmatrix} = \begin{pmatrix} \tan^{-1}\left(\frac{\hat{x}_2(k) - x_{2,s}(k)}{\hat{x}_1(k) - x_{1,s}(k)}\right) \\ \tan^{-1}\left(\frac{\hat{x}_3(k) - x_{3,s}(k)}{\sqrt{(\hat{x}_1(k) - x_{s,1}(k))^2 + (\hat{x}_2(k) - x_{s,2}(k))^2}}\right) \end{pmatrix}, \quad (31)$$

$$\hat{x}_1(k) - x_{1,s}(k) > 0$$

$$h(\hat{x}(k)) = \begin{pmatrix} \hat{\varphi}(k) \\ \hat{\theta}(k) \end{pmatrix} = \begin{pmatrix} \pi + \tan^{-1}\left(\frac{\hat{x}_2(k) - x_{2,s}(k)}{\hat{x}_1(k) - x_{1,s}(k)}\right) \\ \tan^{-1}\left(\frac{\hat{x}_3(k) - x_{3,s}(k)}{\sqrt{(\hat{x}_1(k) - x_{s,1}(k))^2 + (\hat{x}_2(k) - x_{s,2}(k))^2}}\right) \end{pmatrix}, \quad (32)$$

$$\hat{x}_1(k) - x_{1,s}(k) < 0$$

$$\hat{x}_2(k) - x_{2,s}(k) > 0$$

$$h(\hat{x}(k)) = \begin{pmatrix} \hat{\varphi}(k) \\ \hat{\theta}(k) \end{pmatrix} = \begin{pmatrix} -\pi + \tan^{-1}\left(\frac{\hat{x}_2(k) - x_{2,s}(k)}{\hat{x}_1(k) - x_{1,s}(k)}\right) \\ \tan^{-1}\left(\frac{\hat{x}_3(k) - x_{3,s}(k)}{\sqrt{(\hat{x}_1(k) - x_{s,1}(k))^2 + (\hat{x}_2(k) - x_{s,2}(k))^2}}\right) \end{pmatrix}, \quad (33)$$

$$\hat{x}_1(k) - x_{1,s}(k) < 0$$

$$\hat{x}_2(k) - x_{2,s}(k) < 0.$$

A straightforward differentiation results in:

$$\frac{\partial h(\hat{x})(k)}{\partial \hat{x}} = \begin{pmatrix} \frac{\partial \hat{\varphi}}{\partial \hat{x}_1}(k) & \frac{\partial \hat{\varphi}}{\partial \hat{x}_2}(k) \\ \frac{\partial \hat{\theta}}{\partial \hat{x}_1}(k) & \frac{\partial \hat{\theta}}{\partial \hat{x}_2}(k) \end{pmatrix} \quad (34)$$

$$\frac{\partial \hat{\varphi}}{\partial \hat{x}_1}(k) = \frac{1}{\left(1 + \left(\frac{\hat{x}_2(k) - x_{2,s}(k)}{\hat{x}_1(k) - x_{1,s}(k)}\right)^2\right)} \frac{\hat{x}_2(k) - x_{2,s}(k)}{(\hat{x}_1(k) - x_{1,s}(k))^2} \quad (35)$$

$$\frac{\partial \hat{\varphi}}{\partial \hat{x}_2}(k) = \frac{1}{\left(1 + \left(\frac{\hat{x}_2(k) - x_{2,s}(k)}{\hat{x}_1(k) - x_{1,s}(k)}\right)^2\right)} \frac{1}{(\hat{x}_1(k) - x_{1,s}(k))} \quad (36)$$

$$\frac{\partial \hat{\theta}}{\partial \hat{x}_1}(k) = -\frac{1}{\left(1 + \frac{(\hat{x}_3(k) - x_{3,s}(k))^2}{(\hat{x}_1(k) - x_{s,1}(k))^2 + (\hat{x}_2(k) - x_{s,2}(k))^2}\right)} \quad (37)$$

$$\frac{(\hat{x}_1(k) - x_{s,1}(k))}{\left((\hat{x}_1(k) - x_{s,1}(k))^2 + (\hat{x}_2(k) - x_{s,2}(k))^2\right)^{\frac{3}{2}}}$$

$$\frac{\partial \hat{\theta}}{\partial \hat{x}_2}(k) = -\frac{1}{\left(1 + \frac{(\hat{x}_3(k) - x_{3,s}(k))^2}{(\hat{x}_1(k) - x_{s,1}(k))^2 + (\hat{x}_2(k) - x_{s,2}(k))^2}\right)} \quad (38)$$

$$\frac{(\hat{x}_2(k) - x_{s,2}(k))}{\left((\hat{x}_1(k) - x_{s,1}(k))^2 + (\hat{x}_2(k) - x_{s,2}(k))^2\right)^{\frac{3}{2}}}$$

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured to estimate a kinematic state of a UE connected to a wireless communication network of the network node. The network node is configured to obtain measurement information related to a kinematic measurement concerning the UE. The kinematic measurement is achieved at a measuring time. The kinematic measurement belongs to a set of kinematic measurements. The network node is further configured to determine whether the measurement information is consistent with a measurement prediction for the UE valid for the measuring time based on a kinematic state estimation of the UE. The kinematic state estimation is created using kinematic measurements of the set of kinematic measurements. The network node is further configured to discard the measurement information if the measurement information is determined not to be consistent with the measurement prediction for the UE valid for the measuring time in the determining, and to update the kinematic state estimation of the UE with the measurement information if the measurement information is determined to be consistent with the measurement prediction for the UE valid for the measuring time in the determining.

Figure 9:
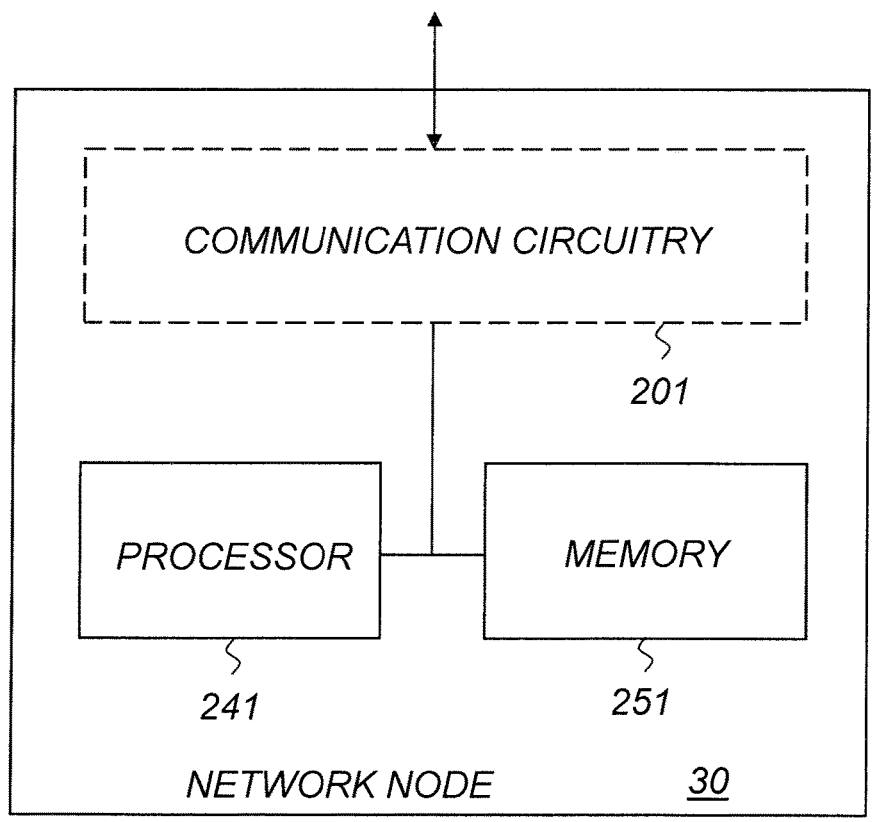
FIG. 9 is a schematic block diagram illustrating an embodiment of a network node.

FIG. 9 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241, whereby the processor 241 is operative to obtain measurement information related to a kinematic measurement concerning the UE. The kinematic measurement being achieved at a measuring time. The kinematic measurement belonging to a set of kinematic measurements. The processor 241 is further operative to determine whether the measurement information is consistent with a measurement prediction for the UE valid for the measuring time based on a kinematic state estimation of the UE. The kinematic state estimation is created using kinematic measurements of the set of kinematic measurements. The processor 241 is further operative to discard the measurement information if the measurement information is determined not to be consistent with the measurement prediction for the UE valid for the measuring time in the determining, and to update the kinematic state estimation of the UE with the measurement information if the measurement information is determined to be consistent with the measurement prediction for the UE valid for the measuring time in the determining.

Optionally, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit

201 may include any of the following: a receiver, a transmitter, a transceiver, input/output (I/O) circuitry, input port(s) and/or output port(s).

In one embodiment, the network node is configured to perform the determining by calculating a measurement prediction for the UE valid for the measuring time based on the kinematic state estimation of the UE and computing a prediction error representing a difference between the calculated measurement prediction and the kinematic measurement. The measurement information is determined to be consistent with the measurement prediction if the prediction error is less than a prediction error discrimination threshold.

In a further embodiment, the prediction error threshold is a predetermined prediction error discrimination threshold.

In another further embodiment, the network node is configured to perform the determining by further establishing of the prediction error discrimination threshold in dependence of an uncertainty of the measurement prediction for the UE. In a further embodiment, the prediction error discrimination threshold is established to be equal to a predetermined significance level of a $\chi^2$ distribution of the measurement prediction for the UE. In yet a further embodiment, the predetermined significance level is 95%.

In one embodiment, the network node is configured to perform the kinematic state estimation using Kalman filtering. In a further embodiment, the network node is configured to perform the kinematic state estimation using extended Kalman filtering.

In one embodiment, the measurement prediction for the UE is calculated using the kinematic state estimation of the UE propagated to the measuring time, and the prediction error discrimination threshold is dependent on a state covariance matrix of the Kalman filtering of the kinematic state estimation.

In one embodiment, the set of kinematic measurements comprises round-trip time measurements from at least three sites.

In one embodiment, the set of kinematic measurements comprises path loss or received power measurements with respect to at least three sites and additional Doppler measurements.

In one embodiment, the set of kinematic measurements comprises timing advance measurements with respect to a serving base station, path loss/received power measurements with respect to at least two neighbor sites and Doppler measurements.

In one embodiment, the set of kinematic measurements comprises timing advance measurements or path loss measurements with respect to a serving base station and angle of arrival measurements in the serving base station.

In one embodiment, the network node is further configured to perform the updating of the kinematic state estimation of the UE by interacting-multiple-model filtering. Preferably, the interacting-multiple-model filtering comprises three interacting models. More preferably, the interacting-multiple-model filtering comprises a three-dimensional constant velocity movement Wiener process, a three-dimensional constant acceleration movement Wiener process, and a three-dimensional constant position Wiener process.

In one embodiment, the interacting-multiple-model filtering comprises a reduced switching probability between the three-dimensional constant velocity movement Wiener process and the three-dimensional constant position Wiener process.

Figure 10:
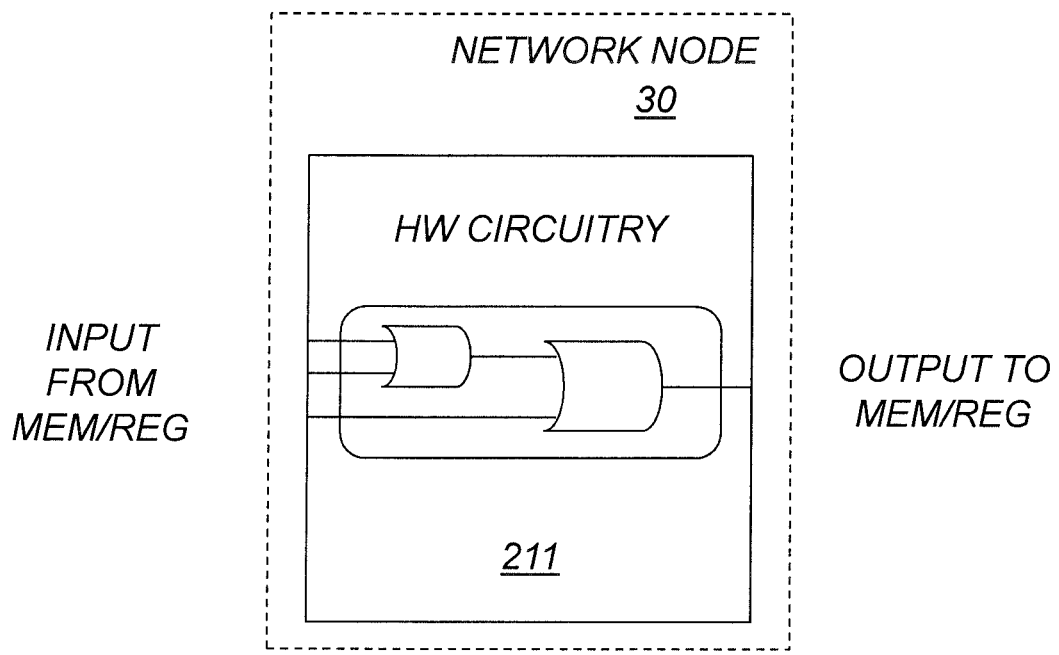
FIG. 10 is a schematic block diagram illustrating an embodiment of a network node based on a hardware circuitry implementation.

FIG. 10 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 11:
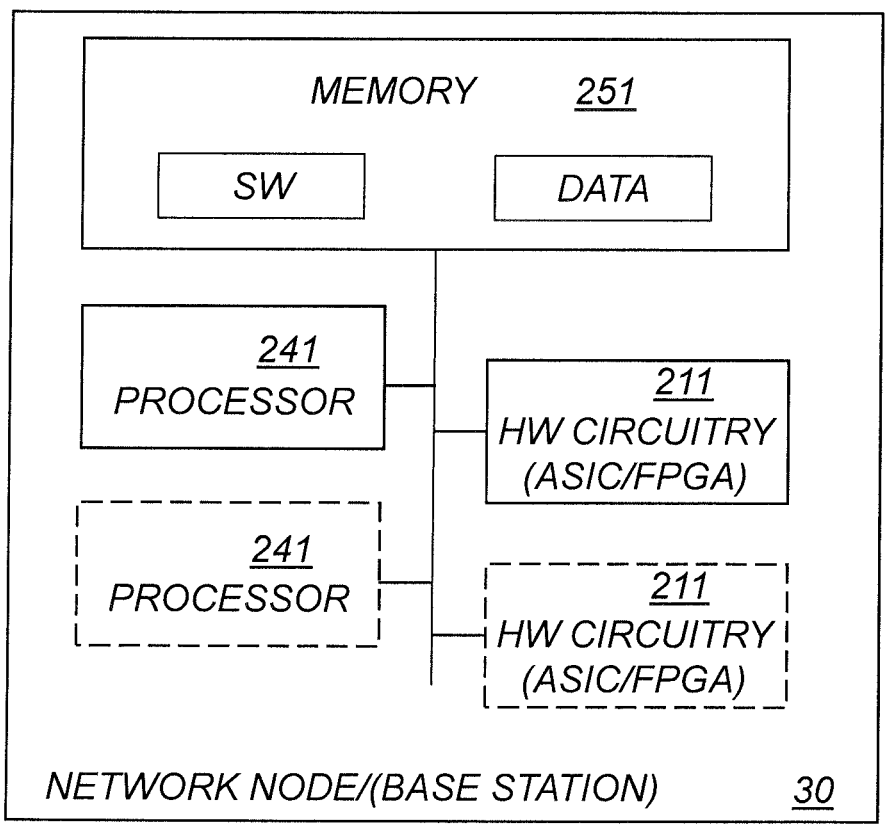
FIG. 11 is a schematic block diagram illustrating another embodiment of a network node based on combination of both processor and hardware circuitry.

FIG. 11 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 12 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to obtain measurement information related to a kinematic measurement concerning a UE. The kinematic measurement being achieved at a measuring time. The kinematic measurement belonging to a set of kinematic measurements. The instructions, when executed by the processor(s) 241, further cause the processor(s) 241 to determine whether the measurement information is consistent with a measurement prediction for the UE valid for the measuring time based on a kinematic state estimation of the UE. The kinematic state estimation is created using kinematic measurements of the set of kinematic measurements. The instructions, when executed by the processor(s) 241, further cause the processor(s) 241 to discard the measurement information if the measurement information is determined not to be consistent with the measurement prediction for the UE valid for the measuring time in the determining. The instructions, when executed by the processor(s) 241, further cause the processor(s) 241 to update the kinematic state estimation of the UE with the measurement information if the measurement information is determined to be consistent with the measurement prediction for the UE valid for the measuring time in the determining.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium. In one embodiment, a computer-program product comprises a computer-readable medium having stored thereon a computer program as described elsewhere in the present disclosure.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

By way of example, the software or computer program 230; 239 may be realized as a computer program product, which is normally carried or stored on a computer-readable medium 255; 259, in particular a non-volatile medium.

FIG. 13 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 14:
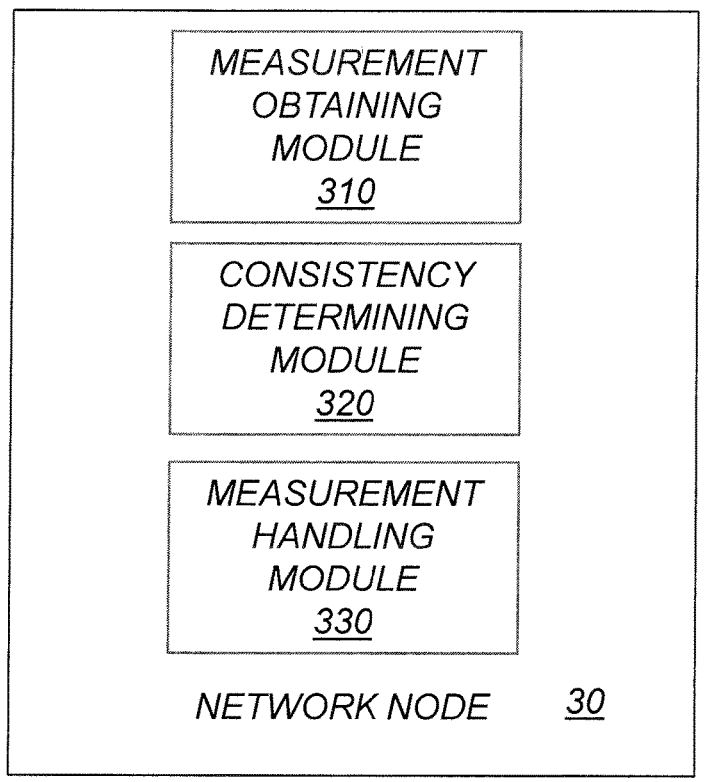
FIG. 14 is a schematic diagram illustrating an embodiment of a network node.

FIG. 14 is a schematic diagram illustrating an example of a network node 30 for kinematic state estimation of a UE connected to a wireless communication network. The network node 30 comprises a measurement obtaining module 310 for obtaining measurement information related to a kinematic measurement concerning the UE. The kinematic measurement is achieved at a measuring time. The kinematic measurement belongs to a set of kinematic measurements. The network node 30 further comprises a consistency determining module 320 for determining whether the measurement information is consistent with a measurement prediction for the UE valid for the measuring time based on a kinematic state estimation of the UE. The kinematic state estimation is created using kinematic measurements of the set of kinematic measurements. The network node 30 further comprises a measurement handling module 330 for discarding the measurement information if the measurement information is determined not to be consistent with the measurement prediction for the UE valid for the measuring time in the determining and for updating the kinematic state estimation of the UE with the measurement information if the measurement information is determined to be consistent with the measurement prediction for the UE valid for said measuring time in the determining.

Alternatively, it is possible to realize the module(s) in FIG. 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The available types of measurements may also be of relevance when considering potential problems of symmetric state estimates. In case solely range-only measurements or Doppler measurements are used for state estimation, a problem may arise in case the antenna towers are located at approximately the same altitude. This would mean that they are substantially in a same plane. The same situation also occurs in case range-only or Doppler measurements with respect to only three base stations are used. In that case the antenna locations always represent a plane since three points in space define a plane in three dimensions. In cases where a UE is situated somewhere near this plane problems of symmetric state estimates may occur.

Figure 15:
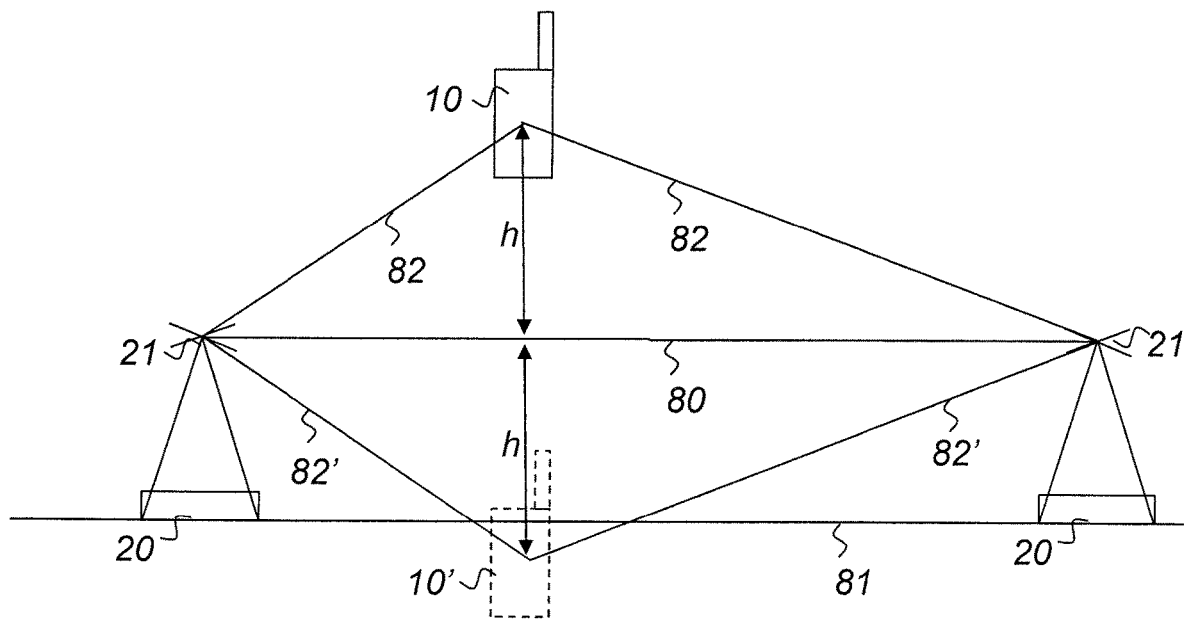
FIG. 15 is a schematic illustration of the problem with symmetric state estimates.

The problem is obvious geometrically. With reference to FIG. 15, consider a UE 10 h meters above such a plane 80 and another "ghost" UE 10' h meters below such a plane 80. Then, any set of ranges, represented by the lines 82 and 82' between the antennas 21 of the base stations 20 and one of the UEs 10, 10', is also consistent with the position of the other UE. This means that UE kinematic state estimates may start moving downwards instead of upwards in case a UE climbs, and vice versa. The risk for such a behavior is largest when the UE is situated in the vicinity of the plane 80. The estimates may even end up below the ground surface 81. By differentiation, it follows that the same problem occurs for Doppler frequency measurements.

To mitigate this problem the kinematic state estimate needs to be adjusted with a ground altitude, so that the state estimate becomes representative of whether the UE is above or below ground level.

In other words, in one embodiment, the method for kinematic state estimation comprises the further steps of determining whether a height of the kinematic state estimation of the UE corresponds to a height below a margin distance below ground level. If a height of the kinematic state estimation of the UE corresponds to the height below the margin distance below ground level, the kinematic state estimation is replaced with a mirrored kinematic state estimation, with respect to a plane defined by the antennas of the sites providing the kinematic measurements of the set of measurements.

The following algorithm can be used to project the state estimate to a correct one. If the UE altitude is <$th_1$, i.e. below ground (with a margin), then:

$$x_3 \rightarrow x_3 + 2(x_g - x_3) + 2\langle h_m \rangle = 2(x_G + \langle h_m \rangle) - x_3$$

$$x_6 \rightarrow -x_6$$

$$x_9 \rightarrow -x_9$$

Here $x_g$ denotes the altitude of the ground level and $h_m$ is the height of the mast (above ground). The common plane is here assumed to be parallel to the ground at the altitude of $h_m$.

In other words, in one embodiment, when the sites providing the kinematic measurements of the set of measurements are provided at a same site height, the replacing is performed such that a height is replaced with the double sum of an altitude of the ground level and the site height minus the original height, a velocity in a vertical direction is replaced by the velocity in an opposite direction to the vertical direction, and an acceleration in the vertical direction is replaced by the acceleration in an opposite direction to the vertical direction.

Since the problem is dependent on the actual set of measurements used for the estimation, there are also other approaches for solving this problem. In another embodiment one may exploit a measurement that is not symmetric with respect to a horizontally oriented plane that roughly intersects the involved base station antennas, or in other words a measurement that does not give the same result above and below that plane. It may e.g. be sufficient to find a measurement relative to an antenna that is situated significantly offset from the plane of the other antennas.

Thus, in one embodiment, the method further comprises determining whether a height of the kinematic state estimation of the UE corresponds to a height below a margin distance below ground level and if a height of the kinematic state estimation of the UE corresponds to the height below the margin distance below ground level, expanding the set of measurements to involve measurements from a site not being situated in a same plane as the other sites associated with the set of measurements.

Another measurement that may be used to resolve the mirror problem is the elevation angle measurement, deduced from an AoA or an AoT. This measurement indicates if the estimated altitude is above or below the plane in question. Such measurements thus have to be included in the state estimation system with its measurement equation and Jacobian. It is enough that one of the involved base stations produce such an elevation measurement. This is an advantage, since accurate measurement of elevation and azimuth angles normally require an antenna array with vertical extension. Fortunately, such advanced antenna systems (AAS) are being developed and deployed currently, in 4G and 5G cellular systems. They are however not needed everywhere and therefore it is advantageous if only one or a few such base stations are needed for the embodiment to work.

Thus in one embodiment, the method further comprises determining whether a height of the kinematic state estimation of the UE corresponds to a height below a margin distance below ground level, and if a height of the kinematic state estimation of the UE corresponds to the height below the margin distance below ground level, expanding the set of measurements to involve measurements of angle of arrival with respect to a base station.

The margin distance is a predetermined margin distance, equal or larger than zero. The margin distance can be used to tune detection level for an "underground" situation. Since the uncertainty of the height estimation often is large in such systems, small or zero margin distances may cause false detections of "underground" situations. It may in such applications be wise to use a somewhat larger margin distance, in particular since UEs often are situated close to ground. However, in other applications, where the height estimate is very accurate or where it is unlikely that the UE is situated close to ground, the margin distance could be set small or even zero. In one embodiment, the margin distance is determined in dependence of an uncertainty of the height.

The network node, e.g. with reference to FIG. 9, 10, 11, or 12, are configured for performing the above presented procedures.

Thus, in one embodiment, the network node is further configured to determine whether a height of the kinematic state estimation of the UE corresponds to a height below a margin distance below ground level. The network node is further configured to, if a height of the kinematic state estimation of the UE corresponds to the height below the margin distance below ground level, replace the kinematic state estimation with a mirrored kinematic state estimation, with respect to a plane defined by the antennas of the sites providing the kinematic measurements of the set of measurements.

In a further embodiment, the network node is further configured to, when the sites providing the kinematic measurements of the set of measurements are provided at a same site height, perform the replacing by replacing a height with the double sum of an altitude of the ground level and the site height minus the original height, by replacing a velocity in a vertical direction by the velocity in an opposite direction to the vertical direction and by replacing an acceleration in the vertical direction by the acceleration in an opposite direction to the vertical direction.

In one embodiment, the network node is further configured to determine whether a height of the kinematic state estimation of the UE corresponds to a height below a margin distance below ground level. The network node is further configured to, if a height of the kinematic state estimation of the UE corresponds to the height below the margin distance below ground level, expand the set of measurements to involve measurements from a site not being situated in a same plane as the other sites associated with the set of measurements.

In one embodiment, the network node is further configured to determine whether a height of the kinematic state estimation of the UE corresponds to a height below a margin distance below ground level. The network node is further configured to, if a height of the kinematic state estimation of the UE corresponds to the height below the margin distance below ground level, expand the set of measurements to involve measurements of angle of arrival with respect to a base station.

The margin distance is a predetermined margin distance, equal or larger than zero.

In one embodiment, the network node is further configured to determine the margin distance in dependence of an uncertainty of the height.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 16:
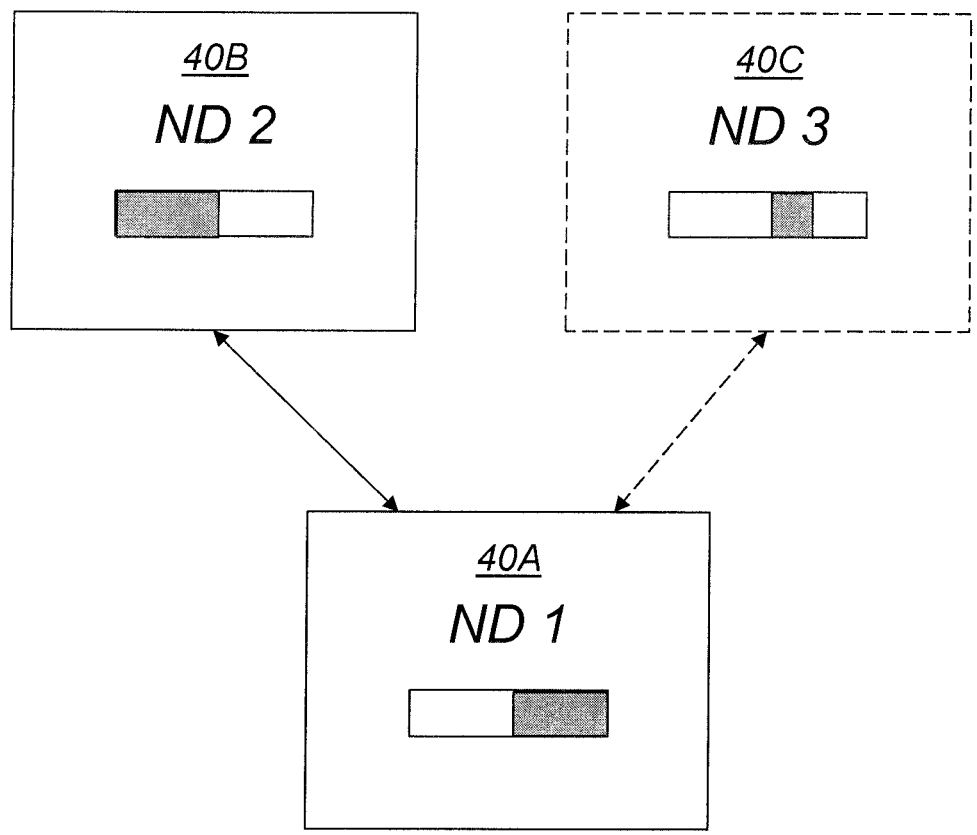
FIG. 16 is a schematic diagram illustrating a general example of functionality distribution or partition.

FIG. 16 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 17:
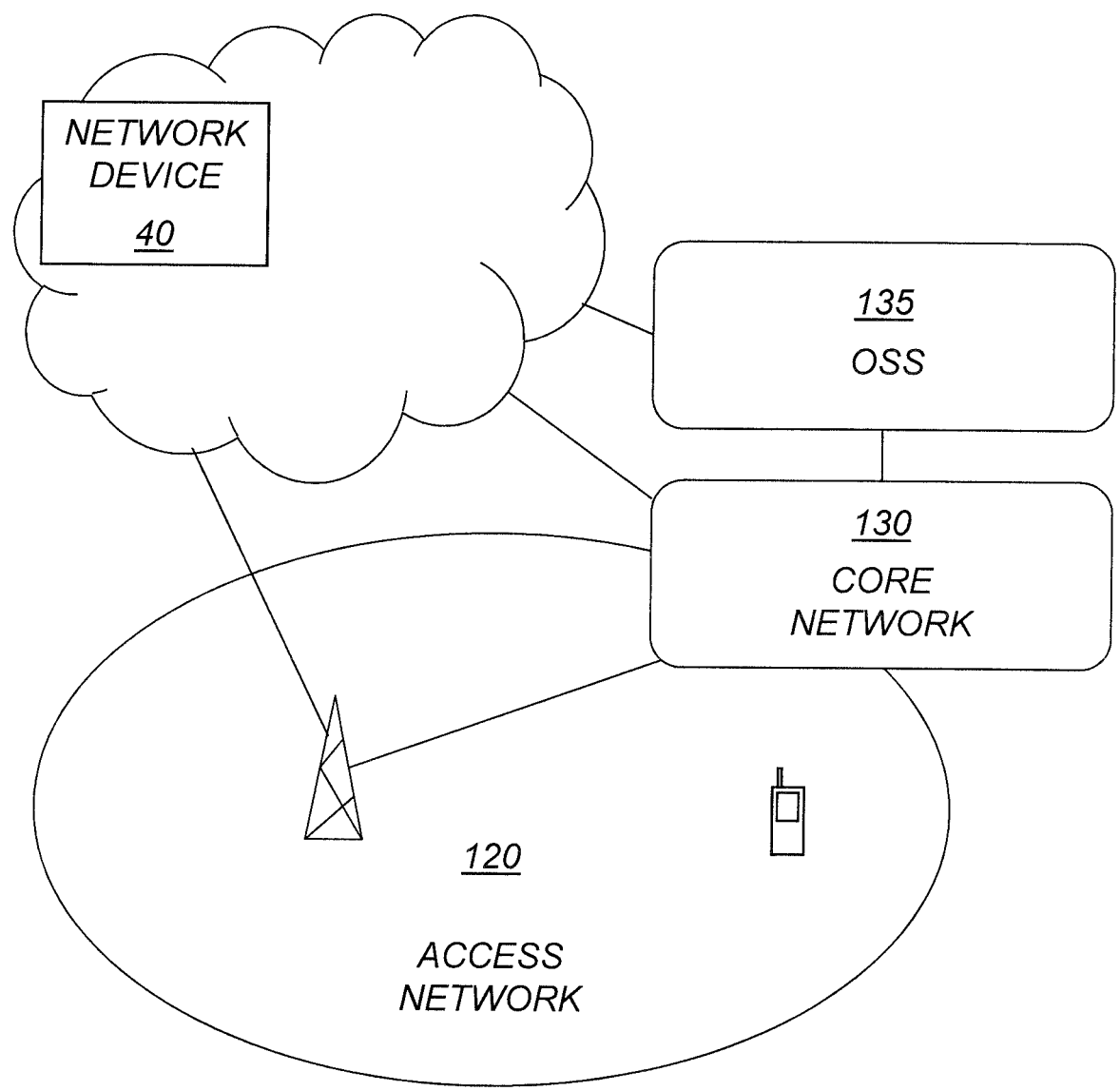
FIG. 17 is a schematic diagram illustrating an example of a wireless communication system in cooperation with one or more cloud-based network devices.

FIG. 17 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

The above presented technology provides means for obtaining a high performing and robust UE kinematic state estimation algorithm, in particular for estimating of rogue drones. Non-LOS and shadowing detection and mitigation algorithms for all sets of measurements that are usable for eNB and gNB based UE kinematic state estimation. Methods for detection of symmetric false mirrored state estimates when performing UE kinematic state estimation are provided, together with correction procedures.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

Figure 1:
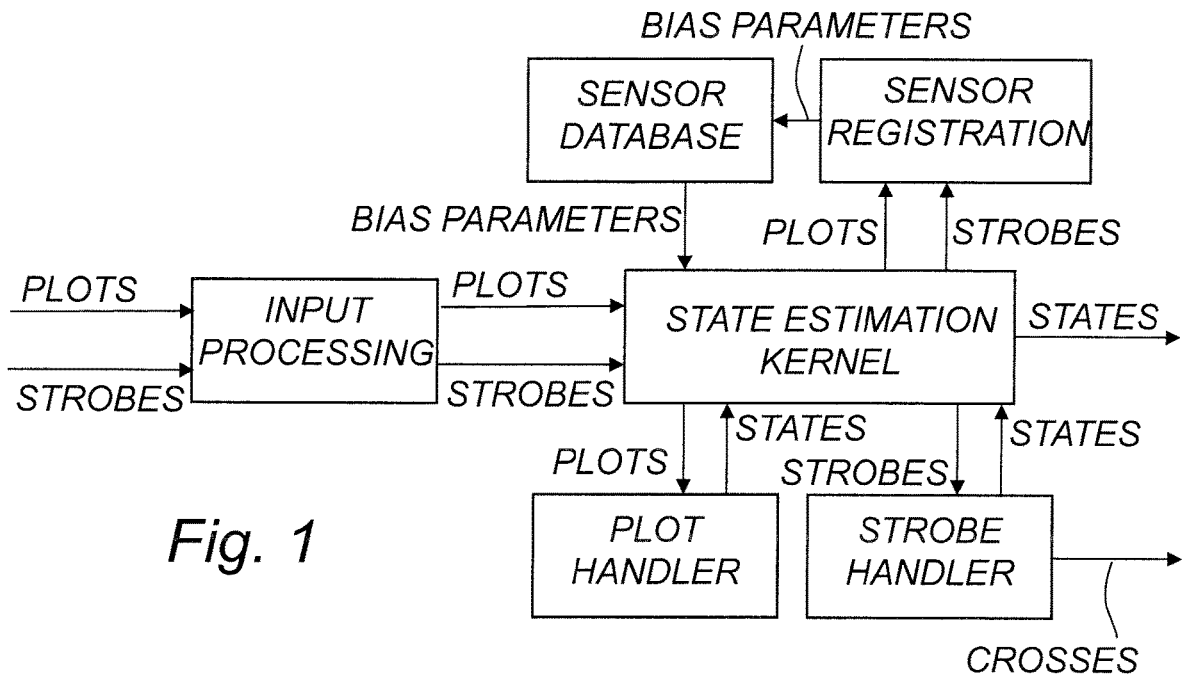
FIG. 1 is an example of a typical moving object kinematic state estimation system.

One example block-diagram of a so-called multi-sensor state estimation system is depicted in FIG. 1.

The operation of this particular system can be briefly explained as follows. Measurements consisting of strobes and plots are first collected from the sensors attached to the moving object estimation system. Strobes are angle-only measurements and plots are Cartesian position measurements. The plots and strobes are sent to an input processing unit for association with existing three-dimensional state estimates. Association is the process of determining which measurements that belong to each state estimate.

The association is performed in the measurement space of each sensor, i.e. the state estimates, which typically reside in an earth tangential Cartesian coordinate system, are transformed to the measurement space of each sensor. Associated data then update state estimates in a state estimation kernel, typically with Kalman filtering techniques, as discussed further below, again in the measurement space of each sensor. Plots and strobes that are not associated may originate from new objects and they are sent to the plot handler or the strobe handler for initiation of new state estimates. Crosses are pairs of strobes tentatively associated with new objects. Plots and strobes that are associated to high quality estimates are also used for computation of sensor bias parameters in the sensor registration block.

If such a state estimation technique is implemented in a wireless communication system, the input measurements may be of a range-only character. In other words, the distance to the object of the state estimation from a sensor is measured, but the direction is basically unknown.

Furthermore, some simplifications may be implemented. In a wireless communication system, each UE has a unique ID when attached to the cellular system. This means that the above described association process is not needed. Moreover, the advanced state initiation is not generally needed in the wireless communication system, but the known techniques may be combined with the technology presented here for further enhancement. Finally, the sensor registration described above is typically not needed in the present implementation. However, the known techniques may be combined with the current ideas for further enhancement.

APPENDIX B

There are many known methods for estimation when multiple dynamic modes describe the behavior of an object, whose state is estimated.

A first and most general way of performing such estimation would be to depend on the joint probability distribution of the objects state. The propagation of this state forward in time is known in prior art to be governed by the so-called Fokker-Planck partial differential equation. The measurement processing is performed by a multi-dimensional integration, to obtain the posterior probability state distribution from the likelihood of the measurement and the prior probability distribution. This process is known under the name Bayesian inference. It is, however, immensely more computationally complex and memory intensive than the solution disclosed further below. In passing it can be mentioned that Bayesian inference is today approximated by so-called particle filters, in which the probability density functions are discretized in terms of individual "particles". Since particle filtering is still immensely more complex than the disclosed solution, the details are not discussed further in detail here.

At the other complexity extreme, each mode can be modeled separately and also estimated separately. Then ad hoc logic may be used to select the movement mode. Traditional kinematic state estimation for e.g. air vehicles was designed in that way. One movement mode was assumed to be constant velocity movement, i.e. straight-line movement, and the other movement mode was a maneuver mode, modeled by a leaky constant velocity movement that responded to measurements with much higher agility than the constant velocity mode. Finally, a maneuver detector was used to choose the maneuver filter in case that was deemed to match measurements better. After the maneuver was terminated a re-initialized constant velocity movement mode was used for kinematic state estimation. This approach was robust but suffered from difficulties in the selection of threshold values for the maneuver detector.

A more systematic approach to the kinematic state estimation problem at hand is offered by the interacting-multiple-model (IMM) filter that was discovered about 30 years ago.

The IMM algorithm assumes that the system behaves according to one of a finite number of models which is one of several modes. These models can differ in noise levels or their structure, such as different state dimensions and unknown inputs. In the IMM approach, at time k the state estimate is computed under each possible model using r filters, with each filter using a different combination of the previous model-conditioned estimates—mixed initial conditions.

Figure 2:
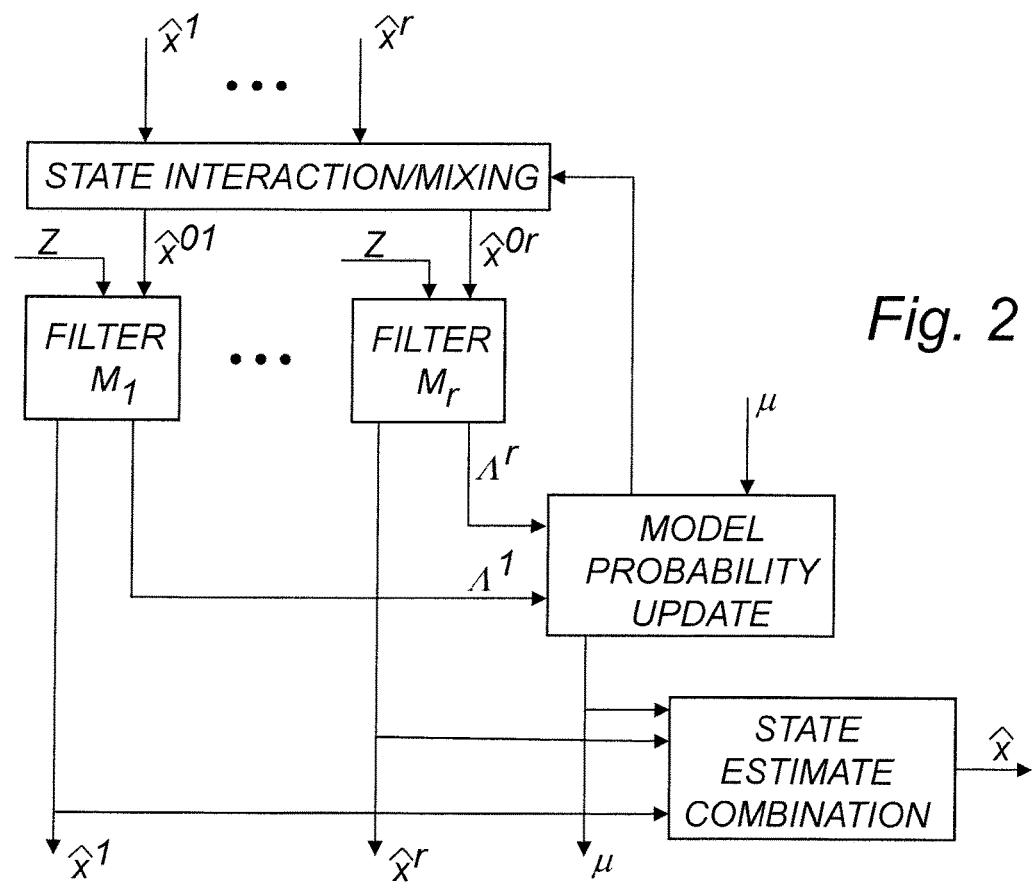
FIG. 2 is a block diagram of a typical example of an interacting-multiple-model algorithm.

FIG. 2 describes one cycle of the typical IMM algorithm, which consists of r interacting filters operating in parallel. The IMM algorithm is described more in detail in Appendix C.

To set up an IMM filter, three main choices needed to be made. First, the movement modes have to be defined. Secondly, the transition probabilities between the movement modes have to be defined. Finally, the initial conditions of the filters have to be selected.

For each movement mode, this amount to the definition of a state space model, i.e., one vector difference equation that defines the dynamics, and another static vector equation that defines the measurement relation, by mapping states to the measurements. In addition, the inaccuracies of the measurement equation and the dynamic state model needs to be given in terms of the covariance matrices of the uncertainties.

The second choice describes, in terms of a hidden Markov model, how the modes interact, this being expressed in terms of the probabilities of a mode transition of the estimated object, between two discrete instances of time.

The third choice is typically made in terms of the expected initial state and covariance of each model.

All these choices are typically specific for the actual implementation of the IMM and are thus more or less unique for each new implementation.

For each filter $M_j$, j=1, . . . , r, a nonlinear Extended Kalman filter (EKF) is typically used. EKF is based on linear approximations of the nonlinear system. It can be used to estimate the state of a discrete-time dynamic system described by a vector difference equation with additive white Gaussian noise that models unpredictable disturbances.

Figure 3:
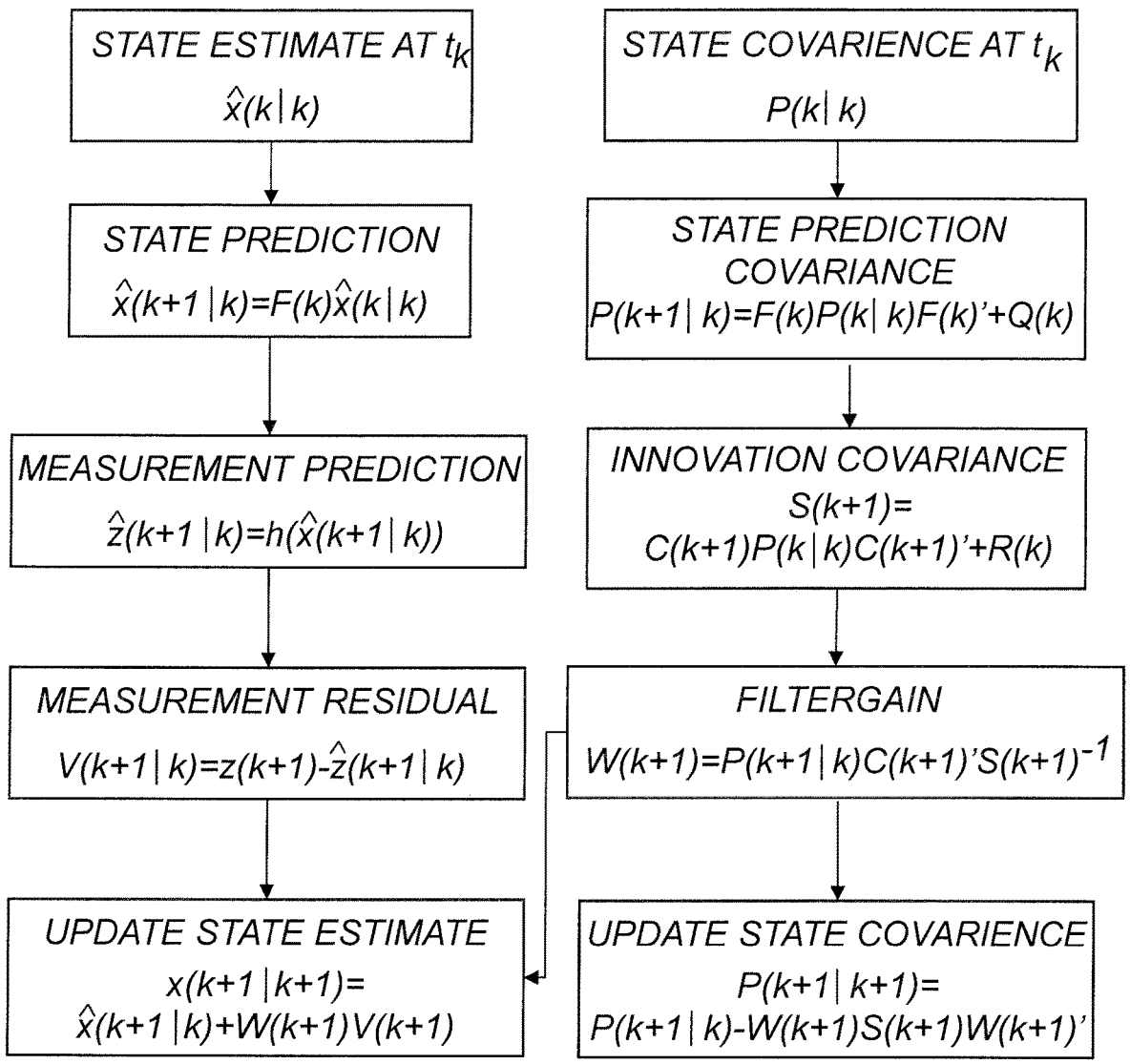
FIG. 3 is an illustration of one cycle of an example of a kinematic state estimation of a linear system with nonlinear measurement.

A flowchart of a typical EKF filter is shown in FIG. 3, and the EKF is described more in detail in Appendix D.

APPENDIX C

FIG. 2 describes one cycle of the typical IMM algorithm, which consists of r interacting filters operating in parallel. The mixing is done at the input of the filters, at the state interaction/mixing unit, with the probabilities, conditioned on data $Z^{k-1}$. The structure of the IMM algorithm is:

$$(N_e; N_f) = (r; r), \quad (C1)$$

where $N_e$ is the number of estimates at the start of the cycle of the algorithm and $N_f$ is the number of filters in the algorithm.

One cycle of the algorithm consists of the following. Mixing probabilities (i,j=1, . . . , r) are calculated. The probability that mode $M_i$ was in effect at time k−1 given that $M_j$ is in effect at k conditioned on $Z^{k-1}$ is:

$$\mu_{i|j} = \frac{1}{\bar{c}_j} p_{ij} \mu_i(k-1), \quad (C2)$$

where the normalizing constants are given by the below equation. This equation uses the mode transition probabilities $p_{ij}$, which is the respective probability that the estimated object is in mode j at time k, conditioned on being in mode i at time k−1. The expression for the normalizing constant is:

$$\bar{c}_j = \Sigma_{i=1}^{r} p_{ij} \mu_i(k-1). \quad (C3)$$

Next, mixing is performed for (j=1, . . . r). Starting with $\hat{x}^i(k-1|k-1)$ one components the mixed initial condition for the filter matched to $M_j(k)$ as:

$$\hat{x}^{0j}(k-1|k-1) = \Sigma_{i=1}^{r} \hat{x}^i(k-1|k-1) \mu_{i|j}(k-1|k-1) \, j=1, \ldots, r. \quad (C4)$$

The covariance corresponding to the above is:

$$P^{0j}(k-1|k-1) = \Sigma_{i=1}^{r} \mu_{i|j}(k-1|k-1) \{P^i(k-1|k+1) + [\hat{x}^i(k-1|k-1) - \hat{x}^{0j}(k-1|k-1)] \cdot [\hat{x}^i(k-1|k-1) - \hat{x}^{0j}(k-1|k-1)]'\}, \quad (C5)$$

with ' denoting the transpose.

Next, mode-matched filtering is performed for (j=1, . . . r). The estimate and the covariance obtained in eq. (5) are used as input to the filter matched to $M_j(k)$, which uses z(k) to yield $\hat{x}^j(k|k)$ and $P^j(k|k)$.

The likelihood function corresponding to the r filters:

$$\Lambda_j(k)=p[z(k)|M_j(k),Z^{k-1}] \quad (C6)$$

are computed using the mixed initial condition and the associated covariance as:

$$\Lambda_j(k)=p[z(k)|M_j(k),\hat{x}^{0j}(k-1|k-1)P^{0j}(k-1|k-1)]$$
$$j=1, \ldots, r. \quad (C7)$$

Model probability update is performed for (j=1, . . . ,r). This is done as follows:

$$\mu_j(k) = \frac{1}{c}\Lambda_j(k)\bar{c}_j \; j=1, \ldots, r, \quad (C8)$$

where $\bar{c}_j$ is given above and $$c=\Sigma_{j=1}^r \Lambda_j(k)\bar{c}_j \quad (C9)$$

is the normalization factor.

Estimate and covariance combination is performed. Combination of the model-conditioned estimates covariances is done according to the mixture equations:

$$\hat{x}(k|k)=\Sigma_{j=1}^r \hat{x}^j(k|k)\mu_j(k)$$

$$P(k|k)=\Sigma_{j=1}^r \mu_j(k)\{P^j(k|k)+[\hat{x}^j(k|k)-\hat{x}(k|k)][\hat{x}^j(k|k)-\hat{x}(k|k)]'\}. \quad (C10)$$

APPENDIX D

The dynamic model of the EKF is:

$$x(k+1)=F(k)x(k)+v(k), \quad (D1)$$

where x(k) is the $n_x$-dimensional state vector, and v(k), k=0, 1, . . . is the sequence of zero-mean white Gaussian process noise (also $n_x$ vectors) with covariance:

$$\mathbb{E}[v(k)v(k)']=Q(k). \quad (D2)$$

The measurement equation is:

$$z(k)=h(x(k),k)+w(k) \; k=1, \ldots \quad (D3)$$

with h(.) being a nonlinear function of state and w(k) the sequence of zero-mean Gaussian measurement noise with covariance:

$$\mathbb{E}[w(k)w(k)']=R(k). \quad (D4)$$

The matrices F, Q, R and the function h(.) are assumed to be known and possibly time varying. In other words, the system can be time varying and the noises nonstationary. The Jacobian of the measurement model h(x(k), k) with respect to k is defined as:

$$C(k) = \frac{\partial H(x(k),k)}{\partial x(k)}. \quad (D5)$$

The initial state x(0), in general unknown, is modeled as a random variable, Gaussian distributed with known mean and covariance. The two noise sequences and the initial state are assumed to be mutually independent. This constitutes the Linear-Gaussian (LG) assumption.

The conditional mean:

$$\hat{x}(j|k)=\mathbb{E}[x(j)|Z^k], \quad (D6)$$

where $Z^k=\{z(j), j\leq k\}$ denotes the sequence of observations available at time k, is the estimate of the state if j=k and predicted value of the state if j>k. The conditional covariance matrix of x(j) given the data $Z^k$ or the covariance associated with the estimate is:

$$P(j|k)=\mathbb{E}[[x(j)-\hat{x}(j|k)][x(j)-\hat{x}(j|k)]'|Z^k]. \quad (D7)$$

The estimation algorithm starts with the initial estimate $\hat{x}(0|0)$ of x(0) and the associated initial covariance P(0|0), assumed to be available. The second (conditioning) index 0 stands for $Z^0$, the initial information.

One cycle of the dynamic estimation algorithm—the Extended Kalman filter (EKF)—will thus consist of the computations to obtain the estimate:

$$\hat{x}(k|k)=\mathbb{E}[x(k)|Z^k] \quad (D8)$$

which is the conditional mean of the state at time k (the current stage) given the observation up to and including time k, and the associated covariance matrix:

$$P(k|k)=\mathbb{E}[[x(k)-\hat{x}(k|k)][x(k)-\hat{x}(k|k)]'|Z^k]. \quad (D9)$$

It remains to describe the propagation to the next update time. This is obtained by the equations:

$$\hat{x}(k+1|k)=A\hat{x}(k|k) \quad (D10)$$

$$P(k+1|k)=AP(k|k)A^T+Q(k). \quad (D11)$$

APPENDIX E

The models discussed in the detailed description of the invention, are defined in continuous time, using differential equations. For computer implementation, they need to be discretized. Given a continuous time Wiener process:

$$dx=Axdt+Bdv \quad (E1)$$

it follows that the discrete time state equation after sampling with the period T is $$x(k+1)=F_i x(k)+v(k) \quad (E2)$$

where $$F_i=e^{A_iT}, \; i=1,2,3 \quad (E3)$$

$$v(k)=\int_0^T e^{A(T-\tau)}B_i\tilde{v}(kT+\tau)d\tau, i=1,2,3 \quad (E4)$$

and with the discretized process noise covariance $$Q=\mathbb{E}[v(k)v(k)']. \quad (E5)$$

It is assumed below that all continuous time equations are discretized like this before applying the IMM filter.

APPENDIX F

The following 3-mode model is believed to constitute a new combination of movement modes, adapted to the hovering movement that drones are capable of. The three models are a 3D constant velocity movement Wiener process, a 3D constant acceleration movement Wiener process, and a 3D constant position Wiener process. The notation "constant" allows for minor fluctuations, so that the first model really concerns an almost constant velocity movement, the second model really concerns an almost constant acceleration movement and the third model really concerns an almost hovering constant position movement.

The continuous time state space constant velocity model is described using the states:

$$x(t) = \begin{bmatrix} x_1 \\ x_2 \\ x_3 \\ \dot{x}_1 \\ \dot{x}_2 \\ \dot{x}_3 \end{bmatrix}, \quad \text{(F1)}$$

where the subscript defines the Cartesian coordinate directions. The model is:

$$\dot{x}(t) = A_1 x(t) + B_1 \hat{v}(t), \quad \text{(F2)}$$

with $$A_1 = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}, B_1 = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad \text{(F3)}$$

The process noise covariance matrix is:

$$Q_{c_1} = \text{diag}([q_{11}\, q_{12}\, q_{13}]), \quad \text{(F4)}$$

where $q_{11}$, $q_{12}$ and $q_{13}$ are the process noise variances.

The continuous time state space constant acceleration model is defined using the states:

$$x(t) = \begin{bmatrix} x_1 \\ x_2 \\ x_3 \\ \dot{x}_1 \\ \dot{x}_2 \\ \dot{x}_3 \\ \ddot{x}_1 \\ \ddot{x}_2 \\ \ddot{x}_3 \end{bmatrix}, \quad \text{(F5)}$$

where the subscript defines the Cartesian coordinate directions. The model is:

$$\dot{x}(t) = A_2 x(t) + B_2 \hat{v}(t) \quad \text{(F6)}$$

$$A_2 = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}, B_2 = \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \quad \text{(F7)}$$

The process noise covariance matrix is $Q_{c_2}$.

The continuous time state space constant position hovering model is defined by the states:

$$x(t) = \begin{bmatrix} x_1 \\ x_2 \\ x_3 \end{bmatrix}, \quad \text{(F8)}$$

where the subscript defines the Cartesian coordinate directions. The model is:

$$\dot{x}(t) = A_3 x(t) + B_3 \hat{v}(t) \quad \text{(F9)}$$

$$A_3 = \begin{bmatrix} 0 & 0 & 0 \\ 0 & 0 & 0 \\ 0 & 0 & 0 \end{bmatrix}, B_3 = \begin{bmatrix} 1 & 0 & 0 \\ 0 & 1 & 0 \\ 0 & 0 & 0.001 \end{bmatrix}. \quad \text{(F10)}$$

The process noise covariance is $Q_{c_3}$.

Another aspect of the preferred IMM filtering process, is related to the physics of the drone movement. When the drone is in constant velocity movement, it cannot stop immediately, it rather brakes. This means that the sequence of mode transitions is from mode 1, over mode 2, to mode 3. The direct mode transmission from mode 1 to mode 3 is forbidden. This is reflected by new constraints in the mode transition probability matrix of the IMM filter, namely in:

$$p_{ij} = \begin{bmatrix} p_{11} & p_{12} & p_{13} \\ p_{21} & p_{22} & p_{23} \\ p_{31} & p_{32} & p_{33} \end{bmatrix}. \quad \text{(F11)}$$

The new restrictions are selected as the following ones:

$$p_{13} \leq \varepsilon_{13}, p_{31} \leq \varepsilon_{31}. \quad \text{(F12)}$$

Here $\varepsilon_{13}$ and $\varepsilon_{31}$ are both much smaller than 1.

APPENDIX G

Models for calculation of the altitude above mean sea level of the ground will be useful to define the technology. A first example of such a system would be a complete geographical information system (GIS) that consist of ground altitude maps covering the region of the cellular system. A second example would be to use a configured ground altitude, for each antenna site of the cellular system. A third example would be to use a model of the ground altitude, valid in the interior of each cell of the cellular system, obtained by the method of [1] T. Wigren, "Wireless hybrid positioning based on surface modeling with polygon support", Proc. VTC 2018 Spring, Porto, Portugal, June, 2018.

Abbreviations

AAS Advanced Antenna Systems
AoA Angle of Arrival
AoT Angle of Transmission
ASIC Application Specific Integrated Circuits
BTS Base Transceiver Stations
CD Compact Disc
COTS Common Off-The-Shelf
CPE Customer Premises Equipment
CPU Central Processing Units
DL Downlink
DSP Digital Signal Processors
DVD Digital Versatile Disc
EKF Extended Kalman Filter
eNB evolved Node B
FPGA Field Programmable Gate Arrays
GIS Geographical Information System
HDD Hard Disk Drive
HW hardware
IMM Interacting-Multiple-Model
I/O input/output LEE Laptop Embedded Equipment
LG Linear-Gaussian
LME Laptop Mounted Equipment
LOS Line-Of-Sight
LTE Long-Term Evolution
MEM memory units
NB Node B
ND Network Device
NFV Network Function Virtualization
NI Network Interfaces
NIC Network Interface Controller
NR New Radio
OFDM Orthogonal Frequency-Division Multiplexing
OS Operating System
OSS Operations and Support System
PC Personal Computer
PDA Personal Digital Assistant
PLC Programmable Logic Controllers
PUCCH Physical Uplink Control Channel
PUCH Physical Uplink Channel
RAM Random Access Memory
REG registers
ROM Read-Only Memory
RRC radio resource protocol
RRU Remote Radio Units
RTT round trip time
SRS Sounding Reference Signal
STA Station
SW software
TA Timing Advance
UE User Equipment
UL Uplink
USB Universal Serial Bus
VM Virtual Machine
VMM Virtual Machine Monitor
VNE Virtual Network Element
WNIC Wireless Network Interface Controller

REFERENCES

[1] T. Wigren, "Wireless hybrid positioning based on surface modeling with polygon support", Proc. VTC 2018 Spring, Porto, Portugal, June, 2018.

The invention claimed is:

1. A method for kinematic state estimation of a user equipment connected to a wireless communication network, comprising:
obtaining measurement information, wherein: the measurement information is related to a kinematic measurement concerning said user equipment, said kinematic measurement is achieved at a measuring time, and said kinematic measurement belongs to a set of kinematic measurements;
determining whether said measurement information is consistent with a measurement prediction for said user equipment valid for said measuring time based on a kinematic state estimation of said user equipment, said kinematic state estimation being created using kinematic measurements of said set of kinematic measurements;
discarding said measurement information if said measurement information is determined not to be consistent with said measurement prediction for said user equipment valid for said measuring time in said step of determining; and
updating said kinematic state estimation of said user equipment with said measurement information if said measurement information is determined to be consistent with said measurement prediction for said user equipment valid for said measuring time in said step of determining.

2. The method of claim 1, wherein said step of determining comprises:
calculating a measurement prediction for said user equipment valid for said measuring time based on said kinematic state estimation of said user equipment;
computing a prediction error representing a difference between said calculated measurement prediction and said kinematic measurement;
wherein said measurement information is determined to be consistent with said measurement prediction if said prediction error is less than a prediction error discrimination threshold.

3. The method of claim 2, wherein said prediction error threshold is a predetermined prediction error discrimination threshold.

4. The method of claim 2, wherein said step of determining further comprises establishing of said prediction error discrimination threshold in dependence of an uncertainty of said measurement prediction for said user equipment.

5. The method of claim 4, wherein said prediction error discrimination threshold is established to be equal to a predetermined significance level of a $\chi^{\wedge 2}$ distribution of said measurement prediction for said user equipment.

6. The method of claim 5, wherein said predetermined significance level is 95%.

7. The method of claim 1, wherein said kinematic state estimation is performed using Kalman filtering, or said kinematic state estimation is performed using extended Kalman filtering.

8. The method of claim 1, wherein
said step of determining further comprises establishing of said prediction error discrimination threshold in dependence of an uncertainty of said measurement prediction for said user equipment,
said kinematic state estimation is performed using Kalman filtering, or said kinematic state estimation is performed using extended Kalman filtering, and
said measurement prediction for said user equipment is calculated using said kinematic state estimation of said user equipment propagated to said measuring time, and said prediction error discrimination threshold is dependent on a state covariance matrix of said Kalman filtering of said kinematic state estimation.

9. The method of claim 1, wherein said set of kinematic measurements comprises round-trip time measurements from at least three sites, or said set of kinematic measurements comprises path loss or received power measurements with respect to at least three sites, together with Doppler measurements, or said set of kinematic measurements comprises timing advance measurements with respect to a serving base station, path loss/received power measurements with respect to at least two neighbor sites and Doppler measurements, or said set of kinematic measurements comprises timing advance measurements or path loss measurements with respect to a serving base station and angle of arrival measurements in said serving base station.

10. The method of claim 9, wherein the further steps of:
determining whether a height of said kinematic state estimation of said user equipment corresponds to a height below a margin distance below ground level;
if a height of said kinematic state estimation of said user equipment corresponds to said height below said margin distance below ground level, replacing said kinematic state estimation with a mirrored kinematic state estimation, with respect to a plane defined by the antennas of the sites providing the kinematic measurements of said set of measurements.

11. The method of claim 10, wherein when said sites providing the kinematic measurements of said set of measurements are provided at a same site height, performing said replacing comprises:
  replacing a height with the double sum of an altitude of said ground level and said site height minus the original height;
  replacing a velocity in a vertical direction by said velocity in an opposite direction to said vertical direction; and
  replacing an acceleration in said vertical direction by said acceleration in an opposite direction to said vertical direction.

12. The method of claim 9, wherein the further steps of:
  determining whether a height of said kinematic state estimation of said user equipment corresponds to a height below a margin distance below ground level;
  if a height of said kinematic state estimation of said user equipment corresponds to said height below said margin distance below ground level, expanding said set of measurements to involve measurements from a site not being situated in a same plane as the other sites associated with the set of measurements, or expanding said set of measurements to involve measurements of angle of arrival with respect to a base station.

13. The method of claim 10, wherein said margin distance is a predetermined margin distance, equal or larger than zero, or said margin distance is determined in dependence of an uncertainty of said height.

14. A network node for kinematic state estimation of a user equipment connected to the wireless communication network of said network node, wherein
  said network node is configured to obtain measurement information, wherein: the measurement information is related to a kinematic measurement concerning said user equipment, said kinematic measurement is achieved at a measuring time, and said kinematic measurement belongs to a set of kinematic measurements;
  said network node is further configured to determine whether said measurement information is consistent with a measurement prediction for said user equipment valid for said measuring time based on a kinematic state estimation of said user equipment, said kinematic state estimation being created using kinematic measurements of said set of kinematic measurements; and
  said network node is further configured to discard said measurement information if said measurement information is determined not to be consistent with said measurement prediction for said user equipment valid for said measuring time in said determining; and to update said kinematic state estimation of said user equipment with said measurement information if said measurement information is determined to be consistent with said measurement prediction for said user equipment valid for said measuring time in said determining.

15. The network node of claim 14, wherein said step of determining comprises:
  calculating a measurement prediction for said user equipment valid for said measuring time based on said kinematic state estimation of said user equipment;
  computing a prediction error representing a difference between said calculated measurement prediction and said kinematic measurement;
  wherein said measurement information is determined to be consistent with said measurement prediction if said prediction error is less than a prediction error discrimination threshold.

16. A non-transitory computer readable storage medium storing a computer program comprising instructions, which when executed by at least one processor, cause said at least one processor to obtain measurement information, wherein: the measurement information is related to a kinematic measurement concerning a user equipment, said kinematic measurement is achieved at a measuring time, and said kinematic measurement belongs to a set of kinematic measurements;
  wherein said instructions, when executed by said at least one processor, further cause said at least one processor to determine whether said measurement information is consistent with a measurement prediction for said user equipment valid for said measuring time based on a kinematic state estimation of said user equipment, said kinematic state estimation being created using kinematic measurements of said set of kinematic measurements;
  wherein said instructions, when executed by said at least one processor, further cause said at least one processor to discard said measurement information if said measurement information is determined not to be consistent with said measurement prediction for said user equipment valid for said measuring time in said determining; and
  wherein said instructions, when executed by said at least one processor, further cause said at least one processor to update said kinematic state estimation of said user equipment with said measurement information if said measurement information is determined to be consistent with said measurement prediction for said user equipment valid for said measuring time in said determining.

17. The non-transitory computer readable storage medium of claim 16, wherein said step of determining comprises:
  calculating a measurement prediction for said user equipment valid for said measuring time based on said kinematic state estimation of said user equipment;
  computing a prediction error representing a difference between said calculated measurement prediction and said kinematic measurement;
  wherein said measurement information is determined to be consistent with said measurement prediction if said prediction error is less than a prediction error discrimination threshold.

* * * * *